US012012780B2

(12) United States Patent
Calleberg

(10) Patent No.: US 12,012,780 B2
(45) Date of Patent: Jun. 18, 2024

(54) BLOCKING MECHANISM FOR A HANDLE ARRANGEMENT

(71) Applicant: Industrilås i Nässjö Aktiebolag, Nässjö (SE)

(72) Inventor: Johan Calleberg, Billdal (SE)

(73) Assignee: INDUSTRILÅS I NÄSSJÖ AKTIEBOLAG, Nässjö (SE)

( * ) Notice: Subject to any disclaimer, the term of this patent is extended or adjusted under 35 U.S.C. 154(b) by 710 days.

(21) Appl. No.: 17/041,331

(22) PCT Filed: Mar. 25, 2019

(86) PCT No.: PCT/EP2019/057434
§ 371 (c)(1),
(2) Date: Sep. 24, 2020

(87) PCT Pub. No.: WO2019/185545
PCT Pub. Date: Oct. 3, 2019

(65) Prior Publication Data

US 2021/0079693 A1 Mar. 18, 2021

(30) Foreign Application Priority Data

Mar. 26, 2018 (EP) .................................... 18163927

(51) Int. Cl.
*E05B 81/00* (2014.01)
*E05B 13/00* (2006.01)
(Continued)

(52) U.S. Cl.
CPC ............ *E05B 63/00* (2013.01); *E05B 13/004* (2013.01); *E05B 47/0012* (2013.01); *E05B 47/0669* (2013.01); *E05Y 2201/434* (2013.01)

(58) Field of Classification Search
CPC ............. E05B 47/0669; E05B 47/0673; E05B 13/004; Y10T 292/0884; Y10T 292/1092; Y10T 292/14
(Continued)

(56) References Cited

U.S. PATENT DOCUMENTS 2,217,098 A * 10/1940 Frederick .................. E05C 3/24 292/216
3,890,813 A * 6/1975 Cothron .................. E05B 57/00 292/210
(Continued)

FOREIGN PATENT DOCUMENTS

AT 373337 B * 1/1984
DE 4443302 A1 * 6/1996 ......... E05B 47/0669
(Continued)

OTHER PUBLICATIONS

International Search Report and Written Opinion for International Application No. PCT/EP2019/057434, mailed Jun. 26, 2019 (13 pages).

*Primary Examiner* — Carlos Lugo
(74) *Attorney, Agent, or Firm* — Kagan Binder, PLLC

(57) ABSTRACT

A blocking mechanism for a handle arrangement comprising, at least one catch member arranged on a first shaft extending along a first axis, a blocking member arranged on a second shaft extending along a second axis, wherein the first axis and the second axis are substantially perpendicular to each other, wherein the blocking member is rotatable around the second axis between a blocking position, in which it is engageable with the catch member to prevent the catch member from rotation around the first axis, and an unblocked position in which rotation of the catch member is enabled.

13 Claims, 17 Drawing Sheets

(51) Int. Cl.
*E05B 47/00* (2006.01)
*E05B 47/06* (2006.01)
*E05B 63/00* (2006.01)

(58) Field of Classification Search
USPC ........................................................ 70/91, 283
See application file for complete search history.

(56) References Cited

U.S. PATENT DOCUMENTS

| | | | | | |
|---|---|---|---|---|---|
| 4,145,900 | A * | 3/1979 | Ohno | E05B 65/104 | 70/92 |
| 4,776,619 | A * | 10/1988 | Daugherty | E05B 65/0811 | 292/201 |
| 5,014,030 | A * | 5/1991 | Aston | E05B 47/0661 | 335/173 |
| 5,136,870 | A * | 8/1992 | Gartner | G07C 9/0069 | 70/277 |
| 5,142,890 | A * | 9/1992 | Uyeda | E05B 65/0082 | 70/229 |
| 5,715,715 | A * | 2/1998 | Nunez | E05B 47/0673 | 292/144 |
| 6,786,519 | B2 * | 9/2004 | Gartner | E05B 47/0603 | 292/195 |
| 7,096,698 | B2 * | 8/2006 | Walsh, III | E05B 47/0012 | 70/277 |
| 7,469,564 | B1 * | 12/2008 | Shaw | E05B 47/023 | 70/279.1 |
| 8,201,858 | B1 * | 6/2012 | Moon | E05B 15/0013 | 292/33 |
| 8,210,580 | B2 * | 7/2012 | Engel | E05B 15/0053 | 403/322.2 |
| 8,292,336 | B2 * | 10/2012 | Moon | E05B 63/04 | 70/462 |
| 8,555,685 | B2 * | 10/2013 | Frolov | E05B 63/16 | 70/482 |
| 8,783,076 | B2 * | 7/2014 | Schwenk | E05B 63/16 | 70/279.1 |
| 9,458,647 | B2 * | 10/2016 | Gartner | E05B 47/0607 | |
| 10,550,600 | B2 * | 2/2020 | Roatis | E05B 15/006 | |
| 2006/0112747 | A1 * | 6/2006 | Moon | E05B 47/0673 | 70/283 |

FOREIGN PATENT DOCUMENTS

| | | | | | |
|---|---|---|---|---|---|
| DE | 20000320 | U1 | | 4/2000 | |
| EP | 2789777 | A2 | | 10/2014 | |
| EP | 3628802 | A1 | * | 4/2020 | E05B 1/0092 |
| FR | 2797461 | A1 | * | 2/2001 | E05B 47/0002 |
| FR | 2900680 | A1 | | 11/2007 | |
| GB | 190902783 | A | | 1/1910 | |
| GB | 2429032 | A | * | 2/2007 | E05B 47/0669 |
| WO | WO-2005042886 | A1 | * | 5/2005 | E05B 47/0002 |

* cited by examiner

BLOCKING MECHANISM FOR A HANDLE ARRANGEMENT

CROSS-REFERENCE TO RELATED APPLICATIONS

This application claims priority to International Application No. PCT/EP2019/057434, filed Mar. 25, 2019 and titled “BLOCKING MECHANISM FOR A HANDLE ARRANGEMENT,” which in turn claims priority from a European Patent Application having Ser. No. 18/163,927.9, filed Mar. 26, 2018, titled “BLOCKING MECHANISM FOR A HANDLE ARRANGEMENT,” both of which are incorporated herein by reference in their entireties

TECHNICAL FIELD

The present disclosure relates to a handle arrangement, and particularly to a blocking mechanism for arrangement to a handle arrangement comprising a compact handle housing.

TECHNICAL BACKGROUND

In the field of handle arrangements, there is usually a blocking mechanism for preventing unauthorized opening of, say, a door or a window. The level of required security of said door or window may impact the form factor of the handle housing and/or the handle and the complexity of the blocking mechanism comprised in the handle housing. In order to be considered sufficiently secure for an intended purpose, the blocking mechanism comprised in the handle housing must meet basic requirements such as toughness and durability, so that the blocking mechanism may withstand forces and bending moments up to a rated magnitude and direction, and also inaccessibility, so that unauthorized tinkering of the blocking mechanism is prevented. Meeting these requirements may result in a blocking mechanism that comprises a large number of components in a plurality of mechanical movements, possibly translational and/or rotational movements. This increases the required size of the handle housing since it must also contain cavities that enables rotational and translational movements of the components of the blocking mechanism. Furthermore, an increasingly more complicated blocking mechanism have a tendency of requiring more components which increases manufacturing cost and likely the consumer buying price. Hence, for every door and window configuration, there is an optimal balance between safety, practicality and production cost to be found.

For instance, most houses today comprise doors that are equipped with the common cylinder lock and/or the older, more complex mortise lock. The former is usually preferred by the consumer as they consider it to provide a good-enough solution in terms of safety for a cheaper price. The cylinder lock typically has a blocking mechanism comprising a latch intended to be rotated around the cylinder axis into a blocking position such that the door or window, when in a closed position, is locked into said closed position.

However, there are a number of problems of the cylinder lock and its blocking mechanism. Typically, the cylinder lock is not as tough as other locks. They may break if sufficient pressure is applied in a vulnerable direction for a sufficiently long duration, possibly applied by pure hand strength alone. If made more resistant, the cylinder locks are still especially vulnerable to picking. Furthermore, many types of cylinder locks require frail components, such as springs and thin metal elements, in order for the blocking mechanism to function as intended. These frail components may break over time due to prolonged use.

A number of inventions aims to provide a more secure solution than the cylinder lock while being cost-efficient. Some of these inventions incorporate electronic circuits for improved security. However, incorporating electronic circuits into handle housing and/or handles may further increase their necessary size and dimensions. In some situations, the dimensions of a handle arrangement may pose a problem. This occurs when a portion of the handle arrangement due to the swing radius abuts the door or window frame when said door or window is attempted to be opened, thus preventing the door or window to be fully opened.

Hence, there is a need for a secure blocking mechanism which is resilient to prolonged pressure while making efficient use of the limited space available within a handle arrangement.

SUMMARY OF THE PRESENT INVENTION

It is an object of the present invention to provide an improved solution that alleviates the mentioned drawbacks with present solutions. Furthermore, it is an object to provide a compact blocking mechanism for arrangement to a handle arrangement.

The invention is defined by the appended independent claims, with embodiments being set forth in the appended dependent claims, in the following description and in the drawings.

According to a first aspect of the invention, there is provided a blocking mechanism that comprises at least one catch member arranged on a first shaft extending along a first axis and a blocking member arranged on a second shaft extending along a second axis, wherein the first axis and the second axis are substantially perpendicular to each other, wherein the blocking member is rotatable around the second axis between a blocking position, in which it is engageable with the catch member to prevent the catch member from rotation around the first axis and an unblocked position in which rotation of the catch member is enabled.

The blocking position and the unblocked position may be defined as follows. The maximum extension in space of the catch member during one revolution of rotation around the first axis may define a volume referred to hereinafter as the unobstructed rotation volume where at least a portion of the blocking member may reside within in order to obstruct the rotation of the catch member. By blocking position, it may be meant that the blocking member has been rotated into a position in which it is preventing the catch member from freely rotating around the first axis, i.e. the blocking member at least partly may reside within the unobstructed rotation volume. In this position, the blocking member may be engageable with the catch member and it may engage with the catch member when the catch member is rotated into contact with the blocking member. In the unblocked position, the blocking member may be in a position where it fully resides outside the unobstructed rotation volume so that the catch member may rotate freely around the first axis. In this position, the blocking member may not be engageable with the catch member. Finally, there is a blocking position in which the blocking member engages maximally with the catch member. This blocking position is referred to specifically hereinafter as the maximal blocking position.

The catch member may have a shape such that the required size of the unobstructed rotation volume is reduced, so that the blocking mechanism takes up less space. The catch member may extend in a plane perpendicular to its axis of rotation, i.e. the first axis. The maximum extension of the catch member along the plane, i.e. the edge of the catch member, may divide the catch member into two sides. The edge of the catch member may have at least one recess configured for receiving the blocking member. The catch member may comprise an extending portion configured for receiving the blocking member. Each side of the catch member may have at least one recess and/or opening configured for receiving the blocking member. The catch member may have at least one opening connecting the two sides of the catch member configured for receiving the blocking member.

The blocking member may have a shape such that it in the unblocked position does not reside within the unobstructed rotation volume but when rotated into a blocking position, at least a portion of the blocking member is rotated into the unobstructed rotation volume. This may be provided by a blocking member being non-symmetrical around the second axis. The blocking member may comprise a boundary and/or a surface configured for engaging with the catch member. Said boundary and/or surface may be configured such that the contact boundary and/or contact surface of the catch member with the blocking member is increased, thereby distributing the contact force over a wider region, thus reducing local stress, allowing the blocking mechanism to withstand torques and forces of greater magnitudes. The blocking member may have a shape that allows for a relatively large contact boundary and/or contact surface. The blocking member may have a simple geometric shape that may easily be produced. The blocking member may have an extending axis in which direction it extends the most. The extending axis may be perpendicular to the second axis. The blocking member may have a cross section in a plane of the extending axis that is, for instance, substantially rectangular, triangular or circular. The blocking member may comprise a substantially flat surface configured for engagement to the catch member. The blocking member may comprise cylindrical surfaces configured for engagement to the catch member. By cylindrical surfaces, it is meant circular, parabolic, elliptic or hyperbolic surfaces or at least a segment or segments thereof. Furthermore, the blocking member may be substantially shaped as a cylinder. The blocking member may in one embodiment be arranged to the second shaft such that the extending axis is parallel to the second axis. The extending axis of the blocking member may also, in another embodiment, be arranged relative the second axis such that it is perpendicular to the second axis. The extending axis may also be perpendicularly offset relative the second axis. Furthermore, the blocking member may be shaped as a hook for blocking the catch member.

The second shaft extends such that the catch member may provide a substantially axial force on the second shaft when the blocking member is in the blocking position. Hence, when the first shaft is tried to be rotated when the blocking member is in the blocking position, and the catch member is blocked from rotation, the force that the catch member may exert on the block member may be directed substantially along the second shaft, i.e. as an axial force on the second shaft. This may provide a strong design since shear forces on the blocking member and the second shaft may be avoided. However, in embodiments where e.g. space is limited, the blocking member and the second shaft may be differently placed, such that shear forces on the second shaft are provided when the catch member is blocked by the blocking member.

The blocking mechanism may be incorporated into a handle arrangement for arrangement to an openable element configured to be movable between a closed position and an open position, wherein the openable element in its closed position covers at least a part of an opening or a gap.

By openable element, it may refer to a door, a hatch, a gate, a window or any other kind of movable element that covers at least a portion of an opening or a gap when said openable element is in a closed position. An openable element suitable for the blocking mechanism further comprises blocking means for securing the openable element in its closed position, wherein the blocking means is arranged to the openable element such that it may engage in a catch means arranged in the vicinity of the opening or gap. When the handle arrangement comprising the blocking mechanism is arranged to the one side of the openable element, the first shaft may comprise means for allowing it to be engageable with the blocking means of the openable element, such that a rotation of the first shaft may result in the blocking means to be moveable between a blocking position and an unblocked position, allowing the openable element to be moved between a closed position and an open position.

An end of the first shaft may extend from the handle arrangement so that a handle may be arranged to it in order to facilitate inducing a rotation of the first shaft for opening the openable element. The opposite end of the first shaft may extend through the openable element to the other side of the openable element the handle arrangement is arranged to so that a handle may be arranged to that end as well.

An advantage of the disclosed blocking mechanism over previous inventions is that it only requires a single mechanical movement of a component, in this case a rotational movement of the blocking member, in order to lock or unlock an opening element in its closed position. Due to only requiring a rotational movement, the blocking mechanism may not require any extra space within the handle arrangement when the blocking member is moving between a blocking position and an unblocked position, contrary to a case where the blocking member engages with the catch member through translational movement. As such, the blocking mechanism according to the present invention may be designed to be more compact compared to previous solutions.

Another advantage of the disclosed blocking mechanism over previous inventions is that it may comprise relatively few components in order to function as intended. Few or no delicate components may be required, which reduces the vulnerability of the blocking mechanism as a whole to torques and forces of greater magnitudes exerted on the blocking mechanism. The first shaft and the catch member may be made in one piece in order to improve structural integrity of the blocking mechanism. The second shaft and the blocking member may also be made in one piece in order to improve the structural integrity of the blocking mechanism. The dimensions of the components may be scaled to an appropriate size to provide sufficient structural integrity of the blocking mechanism for the situation at hand. The blocking mechanism may provide sufficient structural integrity without the use of hardened components while still functioning as intended and provide a resistant solution that may withstand torques and forces not causable by hand strength alone.

In one embodiment, the second axis may be displaced perpendicular to the first axis, i.e. the first axis and the second axis in such an embodiment do not intersect. For instance, the blocking mechanism may be configured such that the blocking member and the second shaft are arranged in relation to the catch member and the first shaft such that when a torque is applied on the first shaft to induce rotation of the first shaft, and consequently the catch member as well, the catch member may exert a force on the blocking member in a blocking position when said catch member is rotated into contact with said blocking member. This may result in that the acting force caused by the applied torque is exerted substantially along the second axis, i.e. axially along the second shaft. Thus, the torque may be transferred mostly as an axial force exerted on the second shaft rather than as shear forces or bending moments, to which a shaft may be more structurally weak to. This results in the blocking mechanism being more adept at managing torques of greater magnitudes making it even more resistant.

According to a further embodiment, the second axis and the first axis may intersect. For instance, the blocking mechanism may be configured such that the blocking member and the second shaft are arranged in relation to the catch member and the first shaft such that when a torque is applied on the first shaft to induce rotation of the first shaft, and consequently the catch member as well, the catch member exerts a force on the blocking member in a blocking position when said catch member is rotated into contact with said blocking member. This may result in that the acting force caused by the applied torque is exerted substantially perpendicular to the second axis, i.e. perpendicular to the second shaft. Thus, the torque is transferred mostly as shear forces or bending moments relative the axial direction of the second shaft. This type of configuration may be useful if the space within the handle arrangement is even more limited, thus allowing for an even more compact solution. A handle plate may be provided with an internal cavity for containing the blocking mechanism. In the following, such a handle plate is referred to as a handle housing. The interior of the handle housing of the handle arrangement may be designed to abut the blocking member and the second shaft, thereby counteracting and keeping the components steady in place even at larger magnitudes of torques and forces.

According to a further embodiment, the blocking member may extend along three perpendicular axes, a third axis, a fourth axis and the second axis wherein said third axis being substantially parallel to the first axis when the blocking member is in a blocking position. The blocking member may be wider along said third axis than along said fourth axis. The blocking member may be rotated in a plane perpendicular to the second axis, the plane spanned by the third and fourth axis. This configuration may be beneficial when space within a handle arrangement is limited. Furthermore, the blocking member may be arranged to the second shaft such that the second axis substantially intersects the midpoint of the blocking member. In this configuration, the blocking member is centered and further reduces the required revolving space around the blocking member. The midpoint may also be offset perpendicularly from the second axis. In this configuration, revolving space may be further reduced, thus making the blocking mechanism even more compact.

According to a further embodiment, the catch member has at least one recess or opening configured to receive the blocking member in the blocking position. In relation to the recess or opening, there may be at least one receiving surface within the recess configured for engaging with the blocking member when said blocking member is in a blocking position. In this embodiment, the catch member may further be configured for receiving the blocking member when the blocking member is rotated into a blocking position. At least one of the receiving surfaces may have a shape that corresponds to the shape of the blocking member in order to increase the contact region between the catch member and the blocking member to reduce the overall pressure of the blocking mechanism. Furthermore, the receiving surface may at least partially have a surface normal that is perpendicular to the first axis and a perpendicular radial vector from the first axis to the receiving surface in question. An advantage of this configuration is that the torque of the first axis may be transferred to the blocking member as a force in a direction substantially parallel to the second axis, thus reducing shearing forces and bending moments.

According to a further embodiment, the catch member may be substantially disc shaped. A catch member according to this embodiment may be manufactured more easily, thus reducing production cost. The catch member may have at least one recess, slot, opening and/or extending member or more. For instance, in the case where the catch member has at least one recess, the at least one recess may be a cut out circular segment of the disc. In this configuration, the catch member may have substantially flat surfaces configured to receive the blocking member.

According to a further embodiment, the blocking mechanism may comprise two catch members arranged a distance apart on the first shaft. When the catch members are arranged apart on the first shaft, and arranged appropriately, the unobstructed rotation volume may comprise two non-overlapping unobstructed rotation volumes. As such, the blocking member may be rotated into an unblocked position between these two volumes, and rotated into a blocking position by being partially rotated into each of the two unobstructed rotation volumes. An advantage of having a blocking mechanism according to this embodiment is that the torque of the first shaft may more easily be transferred as an axial force on the second shaft by the catch member and the blocking member, thus improving the rigidness of the blocking mechanism. The force distribution from the catch member onto the blocking member may thereby be symmetrical about the second axis. The first and second catch members may further be substantially identical in shape. The blocking member may thereby be obstructing the rotation of each of the catch members uniformly.

According to a further embodiment, the catch element comprises a flange arranged a distance apart from the at least one receiving surface, such that the flange and the receiving surface abut the blocking member on opposite sides of the blocking member when the blocking member is in a blocking position. The flange may be configured to prevent the catch member from rotating around the first axis in any direction when the blocking member is in a blocking position. The flange may provide an additional receiving surface configure to abut the blocking member. Furthermore, the flange may, depending on scale and form of embodiment, further facilitate managing axial forces exerted on the second shaft and the blocking member along both directions of the second axis. Furthermore, the flange may be configured to abut the blocking member when the blocking member abuts the receiving surface inside the at least one recess of the catch member. As such, substantially any rotation of the first shaft is prevented as long as the blocking member has not been rotated out of the at least one unobstructed rotation volume. This may be advantageous as it reduces any potential structural damage caused to the blocking mechanism due to a jerking movement. It further enables blocking of the catch member in any rotational direction. The axial force in direction of the second axis B may then either be pulling or pushing depending on the direction of rotation of the first axis and the catch member. The opposite sides of the blocking member may be opposite along the direction of the second axis.

According to a further embodiment, the blocking member is substantially shaped as a modified cuboid, modified such that at least two surfaces of the cuboid are cylindrical surfaces, the modified cuboid comprising at least a first and a second flat surface arranged on opposite sides of the modified cuboid, said first and second flat surfaces extending along planes substantially perpendicular to the second axis, and at least two cylindrical surfaces arranged on opposite sides of the modified cuboid, wherein the symmetry axis of the curvature of the first and the second cylindrical surfaces are parallel to the second axis. By cylindrical surface, it is meant a surface that is a portion of the curved surface of a generalized cylinder, i.e. a circular cylinder, a parabolic cylinder, an elliptic cylinder or a hyperbolic cylinder. Furthermore, the edges connecting the remaining side surfaces of the cuboid to the curved side surfaces of the cuboid may be sharp edges. The remaining side surfaces of the modified cuboid and the curved side surfaces may be seamlessly connected into a partially curved side surface. The curved side surfaces of the modified cuboid may facilitate the robustness of blocking mechanism towards shearing forces and bending moments relative the second axis, thus increasing overall durability. The first and second flat surface of the modified cuboid may further improve engageability of the blocking member to the catch member.

According to a further embodiment, the second shaft comprises a pressure absorbing flange or groove extending along a plane substantially perpendicular to the second axis. A blocking mechanism comprising a pressure absorbing flange or groove as disclosed above may further facilitate the blocking mechanism managing torques and forces of greater magnitudes. The pressure absorbing flange may be shaped as a disc having two main sides and an edge connecting the surfaces of the two main sides, wherein each main side may be configured to abut the interior of a handle housing in order to relieve pressure of the second shaft. The pressure absorbing groove may be shaped as a radial groove on the second shaft configured to receive a correspondingly shaped projection in a handle housing in which the second shaft is arranged. An advantage of this is further durability towards torques and forces of greater magnitudes. The pressure absorbing flange or groove may further prevent a rotation means, such as an electric motor, configured to rotate the second shaft, from being damaged due to torques and forces generated in the blocking mechanism.

According to a further embodiment, the blocking mechanism may further comprise a halting member connected to a spring, said spring pushing the halting member toward the catch portion, said catch portion having at least one recess configured for receiving said halting member such that the catch member is kept in a stationary position when the halting member is pushed into one of the at least one recesses configured for receiving said halting member. An advantage of this is that the catch member may be halted in its rotated and semi-locked position in order to facilitate the blocking member to be rotated into a blocking position.

According to a further embodiment, the second shaft may comprise a cavity, in which cavity a hardened pin may be received. This may further increase the durability of the blocking mechanism, and make it more resistant to stress. The second shaft may be made of a more cost-effective, non-hardened, material, and comprising a hardened pin in order to provide a necessary level of stress resistance.

According to a second aspect of the invention, there is provided a handle arrangement for arrangement to an openable element, wherein said handle arrangement comprises the blocking mechanism according to any of the embodiments above. A handle arrangement comprising the blocking mechanism as disclosed above may be made sufficiently compact such that the handle housing of the handle arrangement may be arranged to an openable element without obstructing the opening movement of the openable element. The handle arrangement may be further equipped with attachment means that make use of already existing attachment means arranged to the openable element. For instance, the handle arrangement may be made suitable for being arranged to doors leading in to a house which may lack sufficient locking means, such as porch doors. The handle arrangement may have attachment means that follow common standards for attachment to openable elements. An advantage of this is that the handle arrangement may be attached to any openable element with preexisting attachment means so that the openable elements is not required to be adjusted when installing the handle arrangement comprising the blocking mechanism. The handle arrangement may be installed at a later time at an appropriate and/or convenient time. The handle arrangement may also be arranged to an openable element lacking any means for locking said openable element in a closed position.

The handle housing of the handle arrangement may have a plurality of recesses in fluid connection with each other, which together have a shape that is suitable for keeping the blocking mechanism substantially in place, including a recess of appropriate size for containing both the catch member and the blocking member of the blocking mechanism. The recess may be of appropriate size to hold the unobstructed rotation volume of the catch member. The plurality of recesses may further be shaped such that the handle housing abuts the blocking mechanism when the blocking mechanism is arranged to the handle housing of the handle arrangement. If the second shaft of the blocking mechanism is equipped with at least one pressure absorbing flange the recess may be shaped such that the handle housing abuts the pressure absorbing flange in order to relieve the second shaft of force pressure.

The handle housing may have a plurality of recesses which branch out in two separate regions of recesses, each separate region of recesses in fluid connection with a shared recess of appropriate size for containing both the catch member and the blocking member of the blocking mechanism, wherein the second shaft and all components arranged to it may be placed in either branch of recesses. When arranged to either of the recess branches, the blocking mechanism may be arranged such that the arrangement of the blocking mechanism to either recess branch involves a substantial mirroring of said arrangement. The mirrored arrangement of the blocking mechanism may be implemented depending on the intended direction of rotation of the first shaft in order to open an openable element. With this configuration, the same housing may be produced for a handle arrangement to be arranged to an opening element irrespective of the direction of rotation the first shaft which opens the openable element.

The first shaft, the second shaft, the blocking member and the catch member may all be further supported by the handle housing of the handle arrangement in order to facilitate the blocking mechanism to absorb torques and forces of magnitudes commonly exerted on the blocking mechanism, or even in more dire situations, for instance when someone attempts to break an entry through said openable element, by breaking the blocking mechanism through exerting excessive torques and forces on the blocking mechanism.

Also, excessive torques and forces may be more prone to cause breaking of the handle or the first shaft than the blocking mechanism itself. As such, the blocking mechanism would still be intact and keep the openable element securely locked even after the first shaft is subjected to breaking.

The handle arrangement may comprise rotating means for rotating the second shaft and the blocking member around the second axis. The rotating means may be connected to the second shaft. The rotating means may be placed inside the handle housing. The rotating means may for instance be an electric motor. The handle arrangement may comprise electric components for directing power from an external power source to said electric motor. The handle arrangement may further comprise a battery and the battery may be arranged within the handle housing. The handle housing may contain further electronic components for connecting the electric motor to the battery. The electric motor may draw power from the battery and rotate the second shaft. The handle arrangement may comprise a distance sensor aimed toward the second shaft and/or blocking member. The second shaft and/or blocking member may have at least one recess with a predetermined depth, sufficiently deep and arranged appropriately, so the distance sensor can provide information from which the orientation of the second shaft and the blocking member may be deduced. The handle arrangement may further comprise a control panel comprising buttons. The handle arrangement may be configured to only block and/or unblock the blocking mechanism if a correct sequence of the buttons is pressed. The buttons may for instance be touch-capacitive.

According to a third aspect of the invention, there is provided a swing handle arrangement for arrangement to a door or a window, said swing handle arrangement comprising a blocking mechanism according to any of the embodiments above, a swing handle rotatable around a joint arranged to the first shaft of the blocking mechanism, wherein the blocking mechanism further comprises a second blocking member, also rotatable around the second axis between a blocking position and an unblocked position, in which the swing handle is released and movable around said joint.

The second blocking member may be arranged relative the first blocking member such that when the second shaft is being rotated when the first and the second blocking members are both in their respective blocked positions, the first blocking member and the second blocking member are both rotated toward their respective unblocked positions. The first blocking member may be rotated into an unblocked position prior to the second blocking member.

The swing handle arrangement may further comprise a handle housing to which the swing handle may be locked, and from which the swing handle may be released when the second blocking member is rotated to the unblocked position. The swing handle arrangement may comprise a spring exerting a force on the swing handle such that the swing handle may swing to an open position by means of said spring when the swing handle is released by the second blocking member.

BRIEF DESCRIPTION OF THE DRAWINGS

The invention will in the following be described in more detail with reference to the enclosed drawings, wherein.

DESCRIPTION OF EMBODIMENTS

Figure 1A:
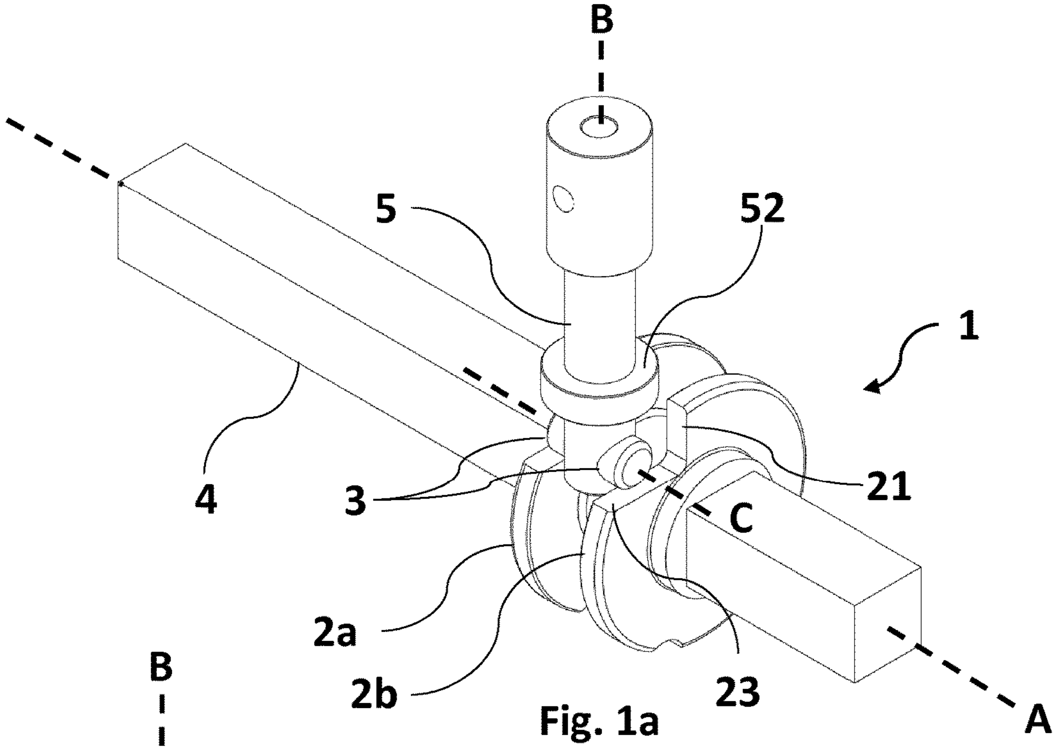
FIGS. 1*a-c* show views of a blocking mechanism according to an embodiment of the present invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

FIG. 1*a* illustrates a blocking mechanism 1 for arrangement to a handle arrangement 100 according to some disclosed embodiments. The blocking mechanism comprises two parallel catch members 2*a*, 2*b* arranged on a first shaft 4 and a blocking member 3 arranged on a second shaft 5 extending in two opposite directions relative the second shaft. The catch members 2*a*, 2*b* and the first shaft 4 are rotatable around a first axis A. The blocking member 3 and the second shaft 5 are rotatable around a second axis B. Each catch member 2*a*, 2*b* has a recess 21 and a receiving surface 23 inside each recess 21. The blocking member 3 is cylinder-shaped and is arranged on the second shaft 5 such that the symmetry axis of the blocking member 3 is arranged along a third axis C that is perpendicular to the second axis B. When the blocking member 3 is in a blocking position, meaning, each end of the blocking member 3 is residing in separate unobstructed rotation volumes of each respective catch member 2*a*, 2*b*, the ends of the blocking member 3 are abutting the receiving surface of each catch member.

Figure 1B:
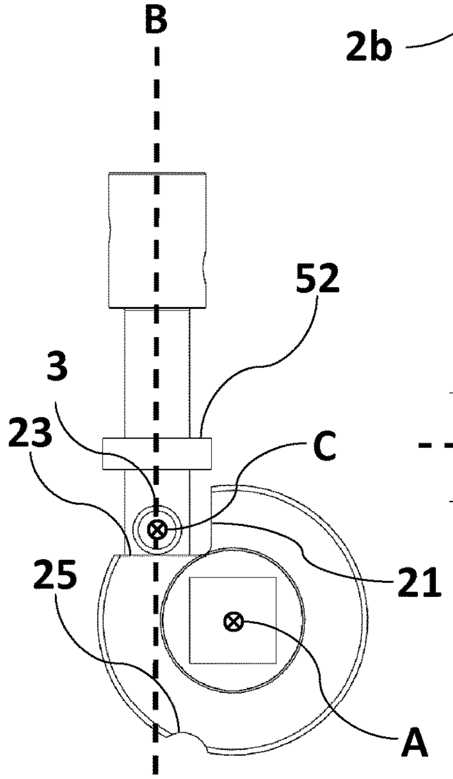
Figure 1C:
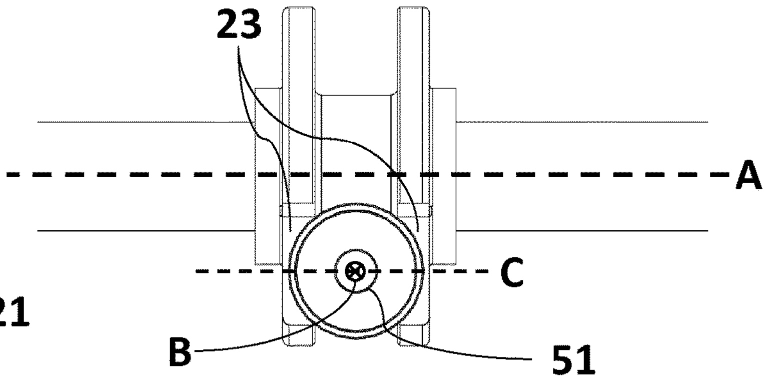

The blocking mechanism 1 also comprises a pressure absorbing flange 52 arranged on the second shaft 5. The catch member also has a halting recess 25. These will be described more in detail below. Furthermore, FIG. 1*b* and FIG. 1*c* illustrates the blocking mechanism 1 viewed from alternate perspectives. FIG. 1*b* illustrates the blocking mechanism 1 viewed from the side in the direction of the first axis A, and FIG. 1*c* illustrates the blocking mechanism 1 viewed from the top in the direction of the second axis B.

Figure 2A:
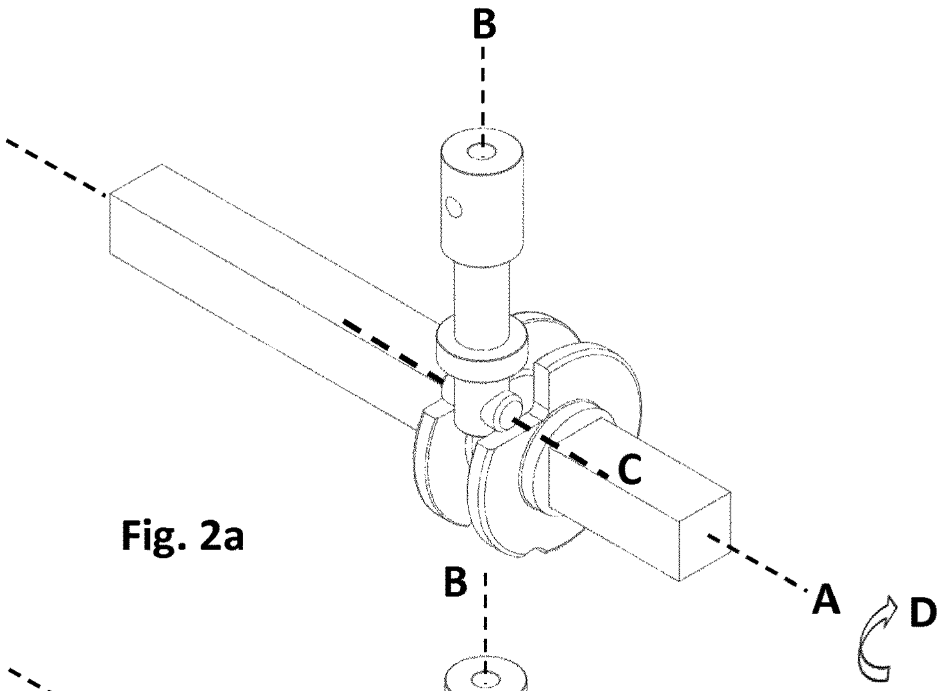
FIGS. 2*a-c* show perspective views of the blocking mechanism according to an embodiment of the present invention.
Figure 2B:
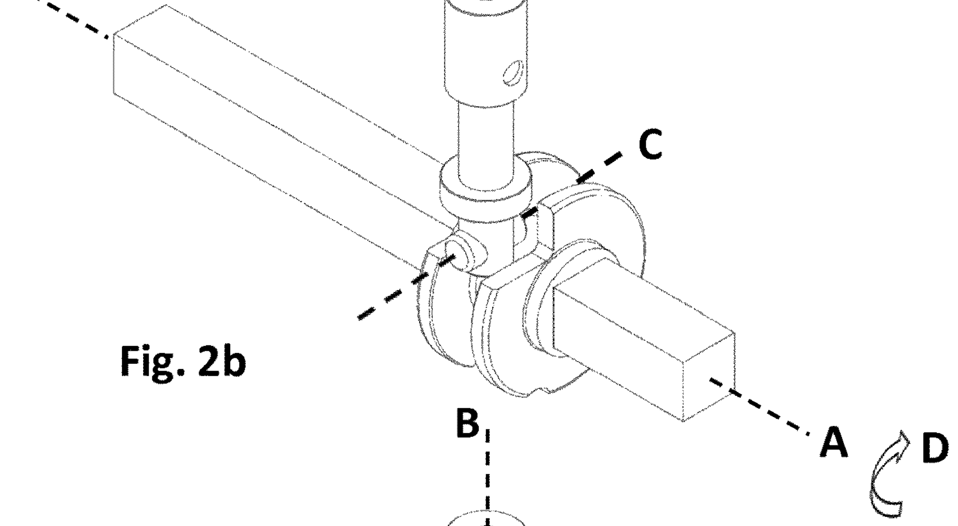
Figure 2C:
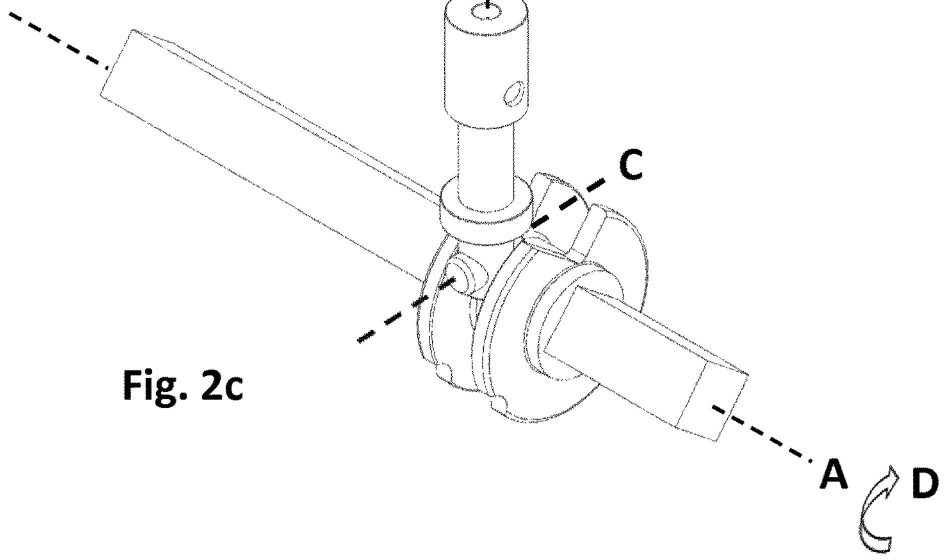

FIGS. 2*a*, 2*b* and 2*c* illustrate the rotation of the blocking member 3 depicted in FIG. 1*a*, 1*b*, 1*c* as it rotates from a blocking position to an unblocked position. FIG. 2*a* illustrates the blocking mechanism 1 when the blocking member 3 are in a blocking position, more specifically, a maximally blocking position as they are maximally engaging with each respective catch member 2*a*, 2*b*, abutting each receiving surface 23 of each catch members 2*a*, 2*b*. The blocking member 3 in contact with the receiving surface 23 will thereby prevent the catch members 2*a*, 2*b* from being rotated along a direction D, and thereby also preventing the first shaft 4 from being rotated. A handle attached to the first axis 4 is thereby prevented from being operated along the rotational direction D. The two catch members 2*a*, 2*b*, when the first shaft 4 is tried to be rotated in direction D around axis A, puts force on the blocking member 3 symmetrically around the second axis B. Shear forces on the second shaft 5 is thereby avoided.

FIG. 2*b* illustrates the blocking mechanism 1 when the blocking member 3 and the second shaft 5 have been rotated 90 degrees around the second axis B such that the third axis C is perpendicular to the first axis A. In this position, the blocking member 3 is in an unblocked position as they have been rotated out of each respective unobstructed rotation volume of each of the catch members 2*a*, 2*b*.

FIG. 2*c* illustrates the blocking mechanism 1 configured as in FIG. 2*b* when the catch members 2 and the first shaft 4 have been rotated in direction D around the first axis A. As can be seen, the blocking member 3 do not obstruct the catch members 2*a*, 2*b* from being rotated around the first axis, thus allowing for free, unobstructed rotation around the first axis A.

Figure 3A:
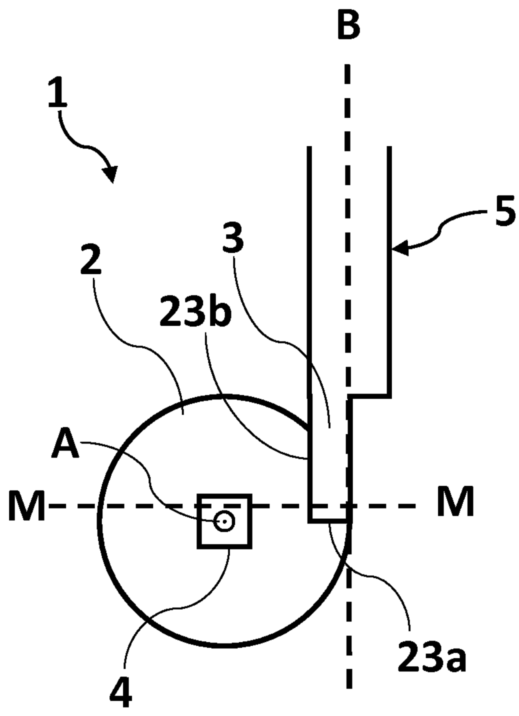
FIGS. 3*a-d* show views of a blocking mechanism according to an embodiment of the present invention.
Figure 3B:
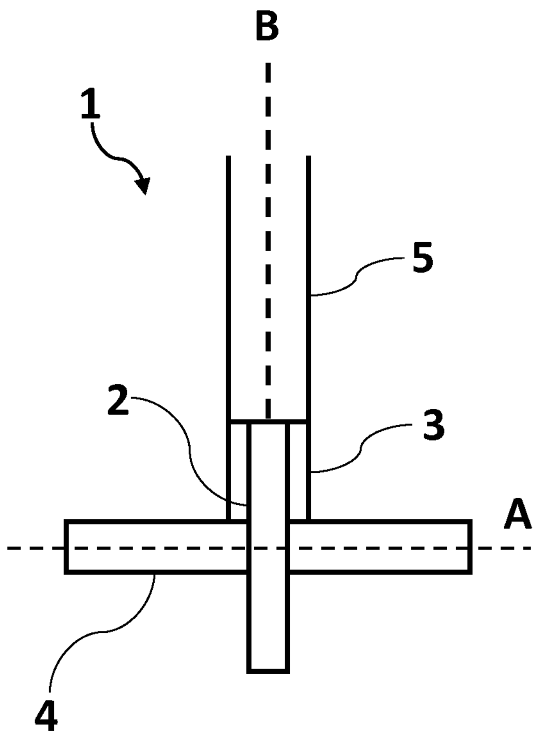
Figure 3C:
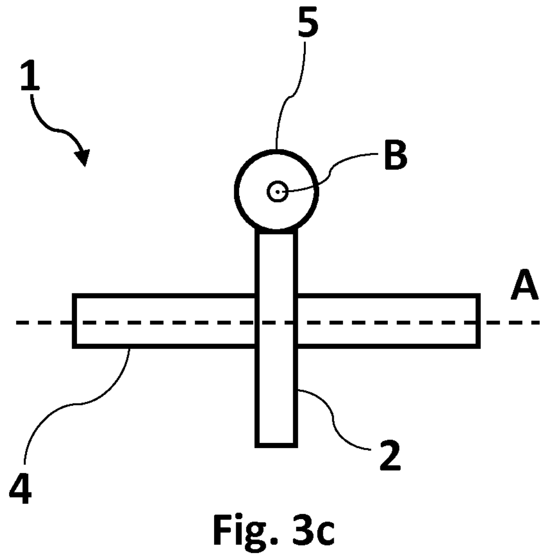
Figure 3D:
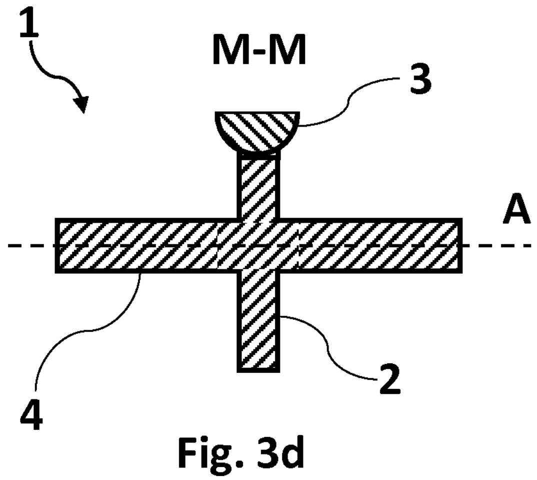

FIGS. 3*a*, 3*b*, 3*c*, 3*d* illustrate a blocking mechanism 1 according to one of the embodiments. The blocking mechanism 1 comprises a catch member 2 arranged on a first shaft 4, rotatable around a first axis A, and a blocking member 3 arranged on a second shaft 5, rotatable around a second axis B. In this embodiment, the blocking member 3 abuts the receiving surfaces 23*a*, 23*b* when in a blocking position. FIG. 3*a* illustrates the blocking mechanism viewed from the side in direction along the first axis A. FIG. 3*b* illustrates the blocking mechanism 1 viewed from the front. FIG. 3*c* illustrates the blocking mechanism as viewed from the top and FIG. 3*d* illustrates a cross section M-M.

The blocking member 3 is formed as an integrated part of the second shaft 5. The blocking member 3 is formed by a partly cutout section of the shaft 5 at the end of the second shaft 5 facing towards the catch member 2. In the illustrated embodiment, the second shaft 5 is circular, and the cutout of the blocking member 3 provides a half circle shaped blocking member 3 as seen in FIG. 3*d*. However, the shaft 5 and the blocking member 3 may have other shapes provided in the same way.

Figure 4A:
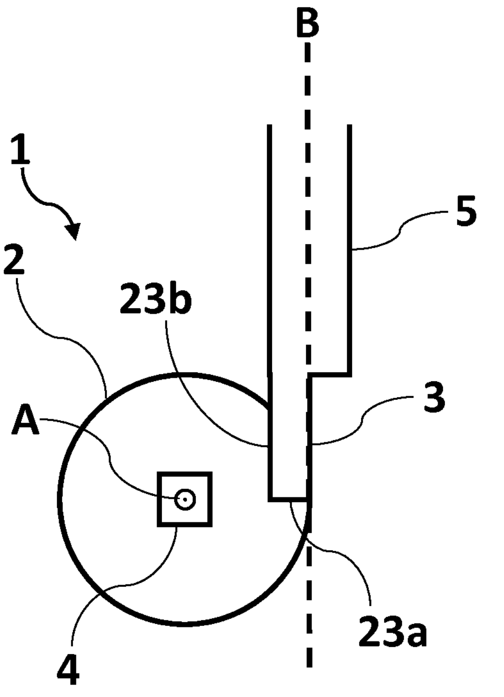
FIGS. 4*a-c* show side views of a blocking mechanism according to an embodiment of the present invention.
Figure 4B:
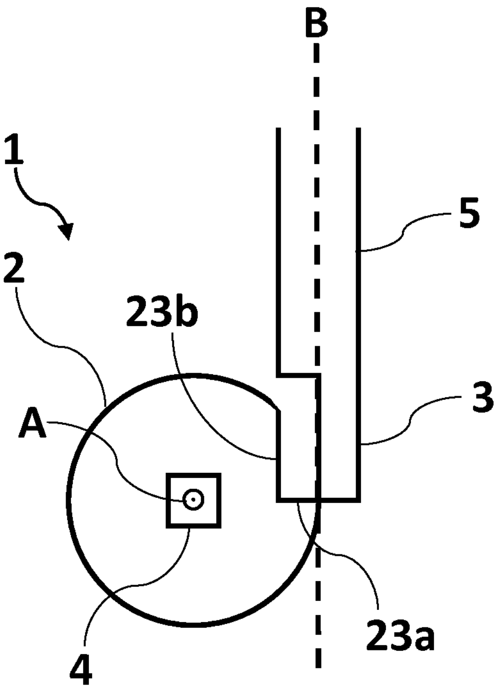
Figure 4C:
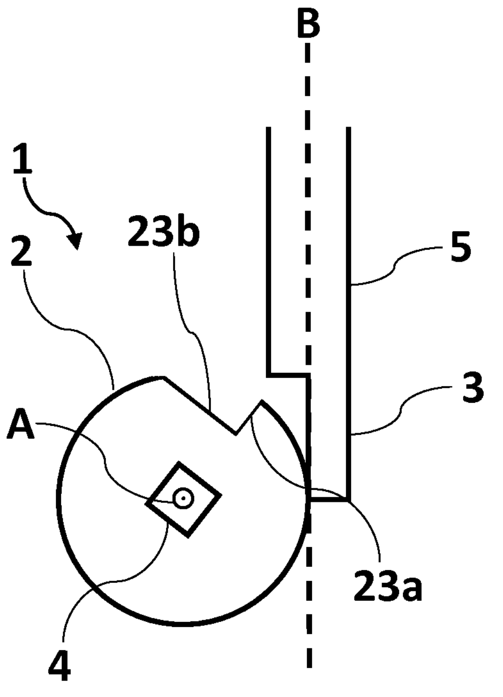

FIG. 4*a*, 4*b*, 4*c* illustrates the rotation of the blocking member 3 depicted in FIGS. 3*a*, 3*b*, 3*c*, 3*d* as it rotates from a blocking position to an unblocked position. FIG. 4*a* illustrates the blocking mechanism 1 when the blocking member 3 is in a blocking position, wherein the blocking member 3 abuts the receiving surfaces 23*a*, 23*b* of the catch member 2. When the blocking member 3 is rotated around the second axis B into an unblocked position, as in FIG. 4*b*, the catch member 2 and the first shaft 4 are free to rotate around the first axis A as shown in FIG. 4*c*.

Figure 5A:
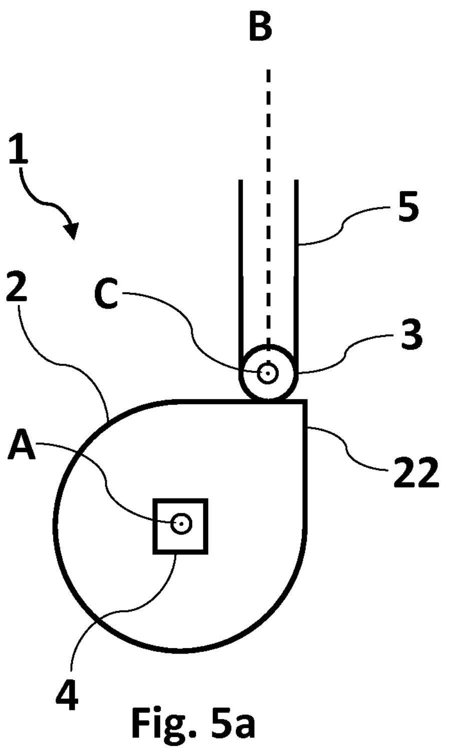
FIGS. 5*a-c* show side views of a blocking mechanism according to an embodiment of the present invention.
Figure 5B:
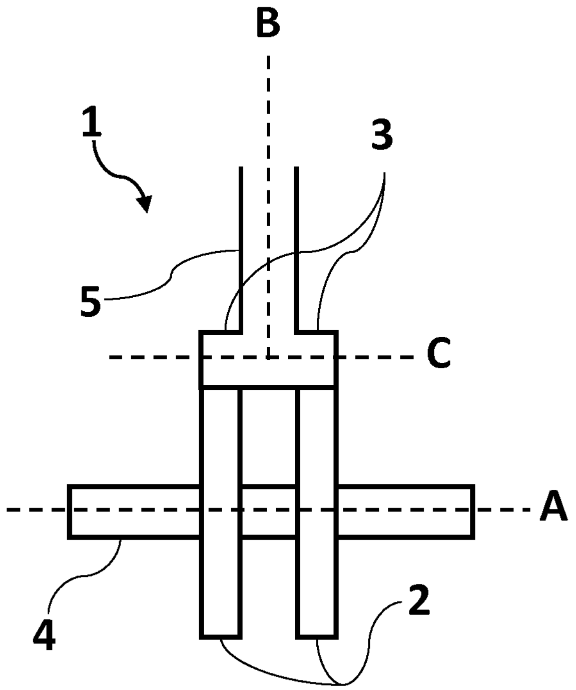
Figure 5C:
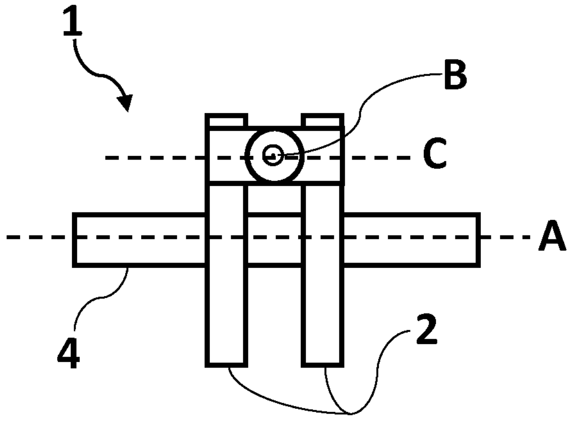

FIG. 5*a*, 5*b*, 5*c* illustrates the blocking mechanism 1 according to one of the embodiments. The blocking mechanism 1 comprises two parallel catch members 2 arranged a distance apart on a first shaft 4, rotatable around a first axis A, and a blocking member 3 arranged on a second shaft 5, rotatable around a second axis B. The catch members 2 each comprises an extending member 22. The blocking member 3 is cylinder shaped and placed on opposite sides of the second shaft axially along the third axis C. FIG. 5*a* illustrates the blocking mechanism 1 viewed in the direction along the first axis A. FIG. 5*b* illustrates the blocking mechanism 1 viewed from the front. FIG. 5*c* illustrates the blocking mechanism 1 as viewed from the top, in the direction along the second axis B. Compared to the embodiment in FIGS. 1-2, the embodiment of FIG. 5 comprises catch members 2 with extending members 22 instead of recesses. In the same way as in the previous embodiment, the blocking member 3 abuts a surface of the extending member 22 in order to prevent the catch members 2 and the first shaft from rotating around the first axis A, when the blocking member 3 is in the blocking position. The shape of the extending member 22 may differ, but may still extend radially further than other sections of the catch member 2.

Figure 6A:
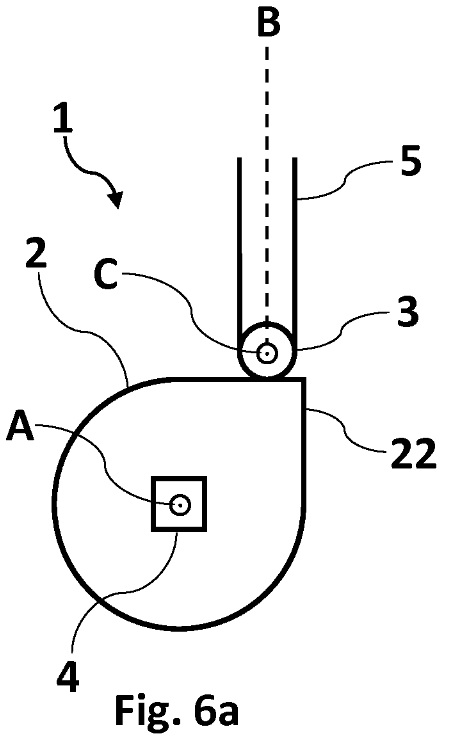
FIGS. 6*a*, 6*b*, 6*c* show side views of a blocking mechanism according to an embodiment of the present invention.
Figure 6B:
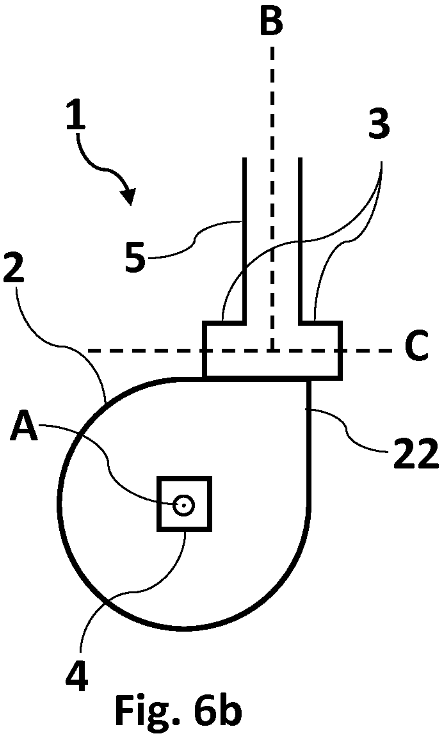
Figure 6C:
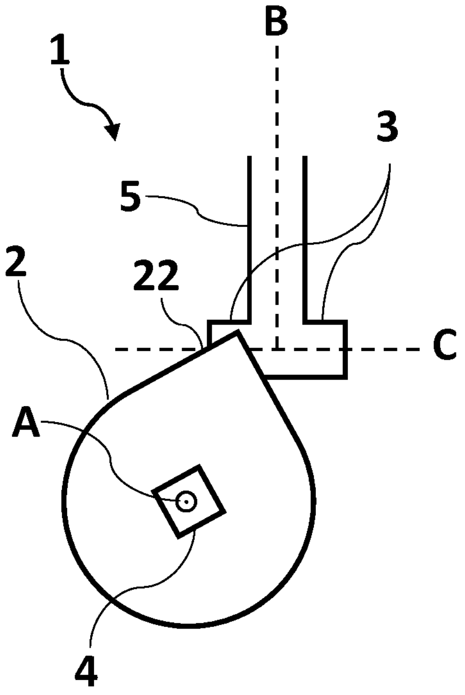

FIG. 6*a*, 6*b*, 6*c* illustrates the rotation of the blocking member depicted in FIG. 5*a*, 5*b*, 5*c* as it rotates from a blocking position to an unblocked position. FIG. 6*a* illustrates the blocking mechanism when the blocking member 3 is in a blocking position, wherein the blocking member 3 abuts the extending member 22 of each catch member 2. When the blocking member 3 is rotated around the second axis B into an unblocked position, as in FIG. 6*b*, the catch member 2 is free to rotate around the first axis A as shown in FIG. 6*c*.

Figure 7A:
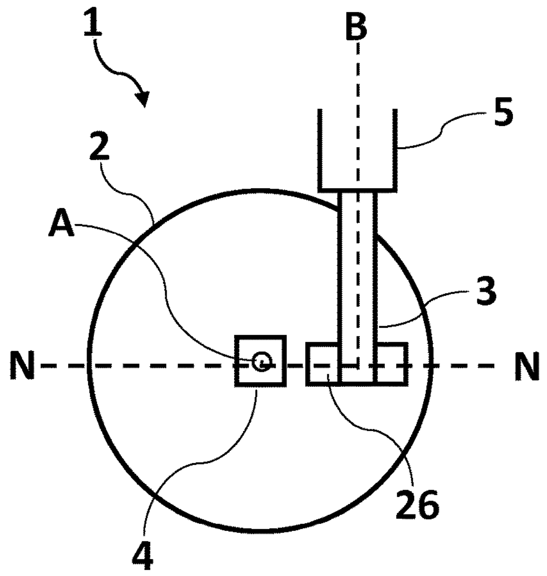
FIGS. 7*a-d* show views of a blocking mechanism according to an embodiment of the present invention.
Figure 7B:
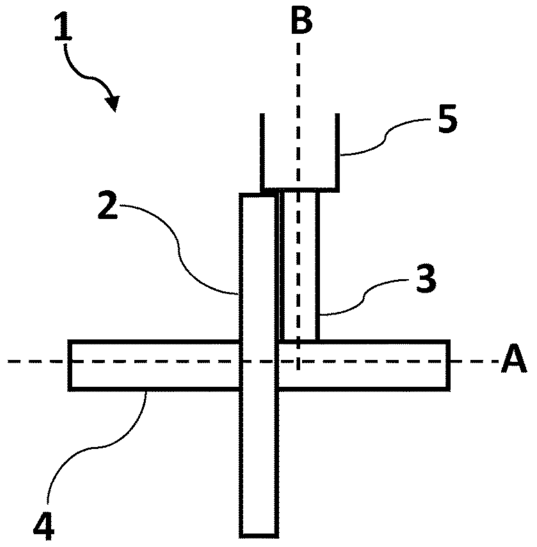
Figure 7C:
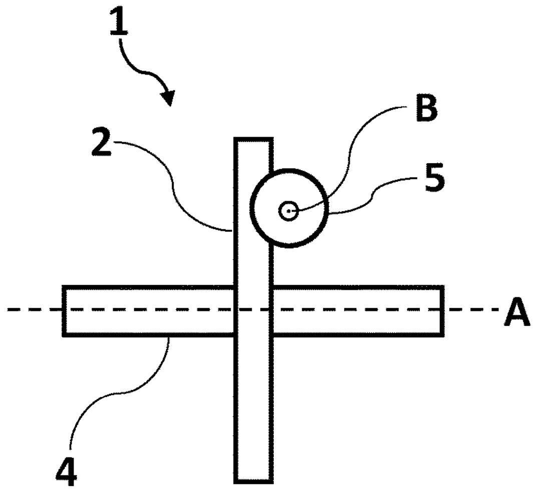
Figure 7D:
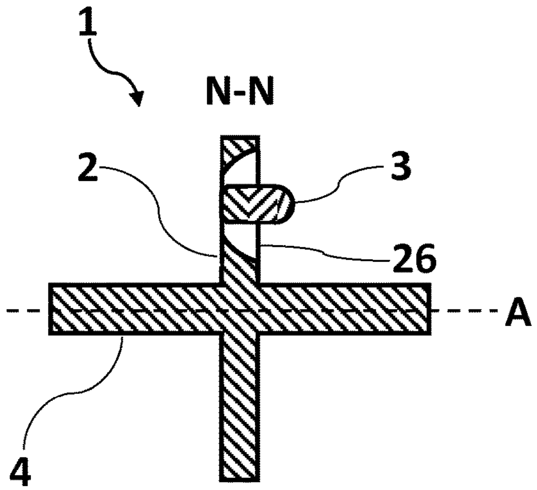

FIG. 7*a*, 7*b*, 7*c*, 7*d* illustrates the blocking mechanism 1 according to one of the embodiments. The blocking mechanism 1 comprises a catch member 2 arranged on a first shaft 4, rotatable around a first axis A, and a blocking member 3 arranged on a second shaft 5, rotatable around a second axis B. The catch member 2, shaped as a disc, has an opening 26 connecting the two circular surfaces. The blocking member 3 is configured to be arranged into said opening 26 when the blocking member 3 is in a blocking position. FIG. 7*a* illustrates the blocking mechanism as viewed in the direction along the first axis A. FIG. 7*b* illustrates the blocking mechanism as viewed from the front. FIG. 7*c* illustrates the blocking mechanism as viewed from the top, in the direction of the second axis B. FIG. 7*d* illustrates a cross section N-N of the blocking mechanism 1, and the characteristics of the opening 26 and the blocking member 3 when in a blocking position.

Figure 8A:
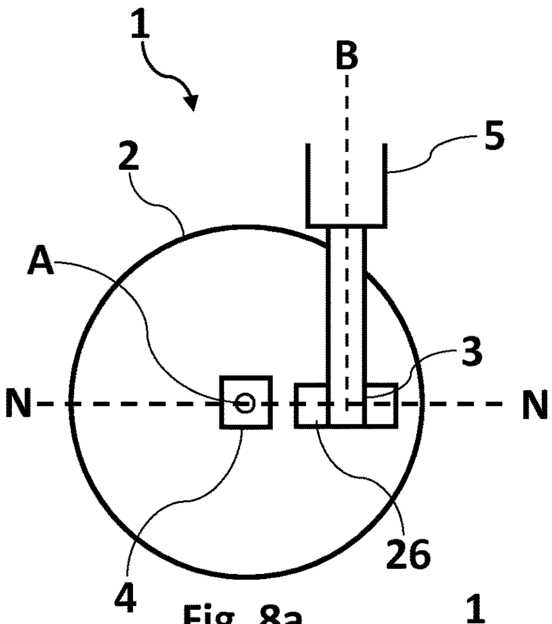
FIGS. 8*a-e* show views of a blocking mechanism according to an embodiment of the present invention.
Figure 8B:
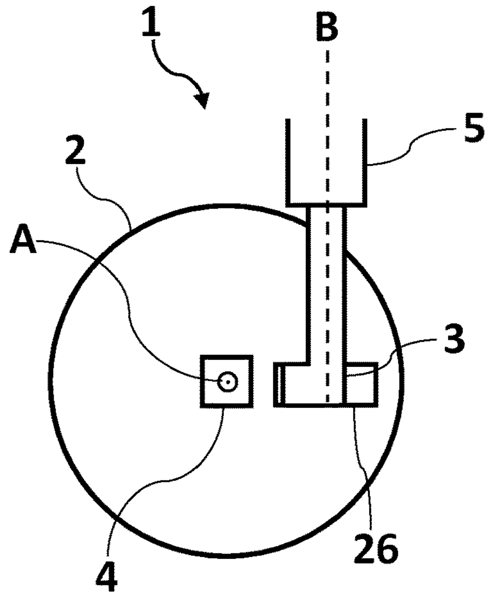
Figure 8C:
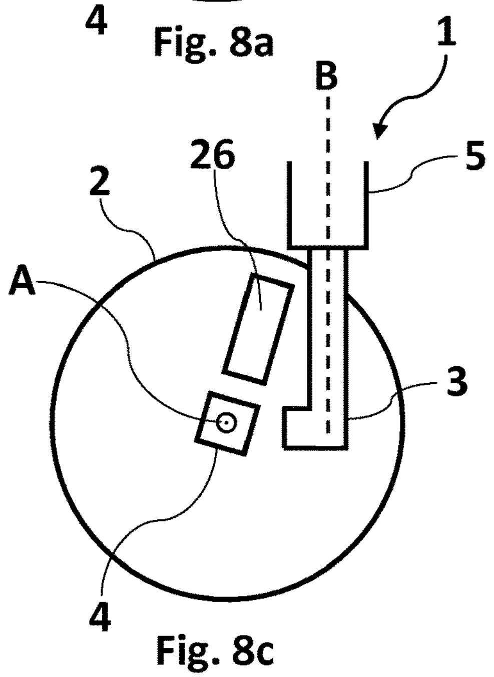
Figure 8D:
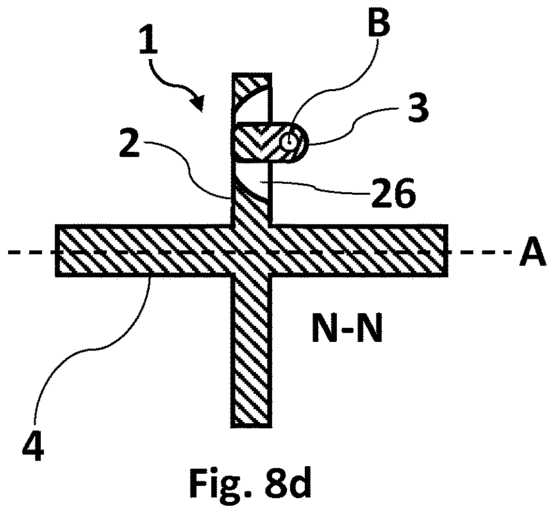
Figure 8E:
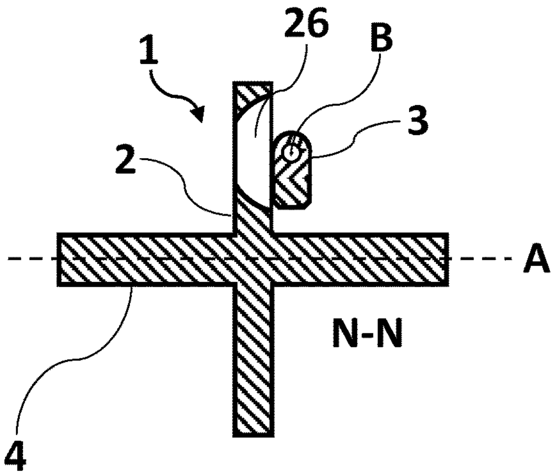

FIGS. 8*a*, 8*b*, 8*c* illustrates the rotation of the blocking member 3 depicted in FIGS. 7*a*, 7*b*, 7*c*, 7*d* as it rotates from a blocking position to an unblocked position. FIGS. 8*d* and 8*e* illustrates the cross-section N-N as the blocking member 3 is moved from a blocking position to an unblocked position. FIG. 8*a*, 8*d* illustrates the blocking mechanism 1 when the blocking member 3 is in a blocking position, wherein the blocking member 3 is engaged with the opening 26 of the catch member 2. When the blocking member 3 is rotated around the second axis B into an unblocked position, as in FIG. 8*b*, 8*d*, the catch member 2 is free to rotate around the first axis A as shown in FIG. 8*c*. As seen in FIGS. 7*d*, 8*e*, the opening 26 has a shape of a cylindrical cutout to correspond to the shape and movement of the blocking member 3 as it moves into the opening 26 and the blocking position.

The embodiment illustrated in FIGS. 7-8 may also comprise two catch members 2, each comprising an opening 26, and the blocking member 3 may extend in both directions symmetrically on either side of second axis B such that it extends into openings 26 of both catch members 2 when in a blocking position.

Figure 9A:
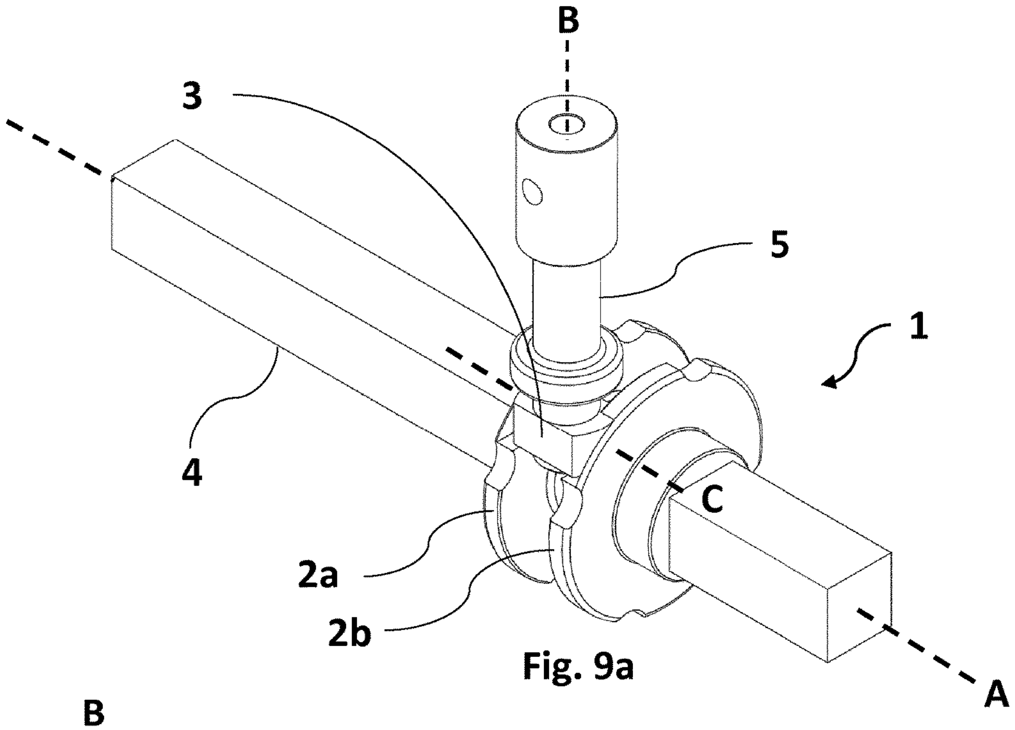
FIGS. 9*a-c* show views of a blocking mechanism according to an embodiment of the present invention.
Figure 9B:
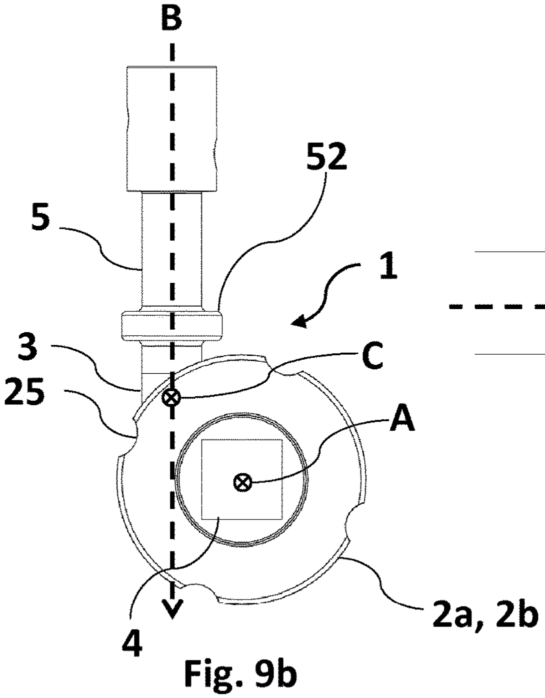
Figure 9C:
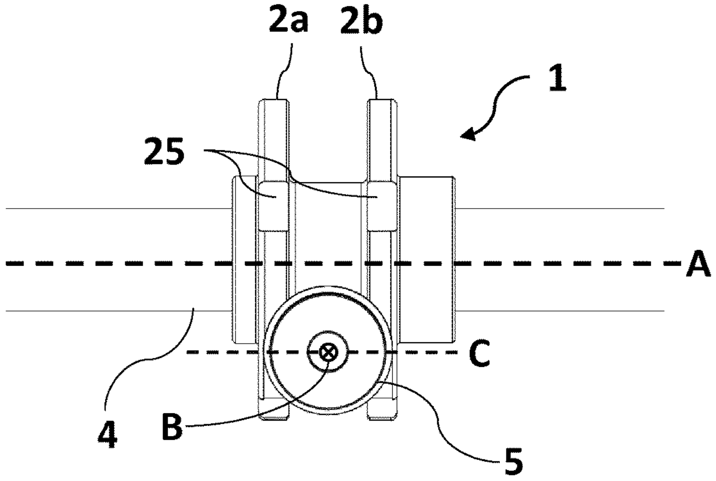

FIGS. 9*a*, 9*b*, 9*c* illustrates the blocking mechanism 1 according to one of the embodiments. The blocking mechanism 1 comprises two parallel catch members 2*a*, 2*b* arranged a distance a part on a first shaft 4 rotatable around a first axis A, and a blocking member 3 arranged on a second shaft 5, rotatable around a second axis B. The catch members 2*a*, 2*b*, shaped substantially as discs, each has a recess 21 which together are configured to contain a portion of the blocking member 3 when the blocking member 3 is in a blocking position. Said blocking member 3 substantially has a cuboid shape, albeit having been modified to have two curved surfaces configured for abut each recess of the catch member when in a blocking position. The blocking member 3 comprises two flat surfaces, a top surface and a bottom surface, configured to move along separate planes during rotation, wherein both planes are perpendicular to the second axis B. FIG. 9*a* illustrates a perspective view of the blocking mechanism. FIG. 9*b* illustrates the blocking mechanism as viewed in the direction of the first axis A. FIG. 9*c* illustrates the blocking mechanism as viewed from the top, in the direction of the second axis B.

Figure 10A:
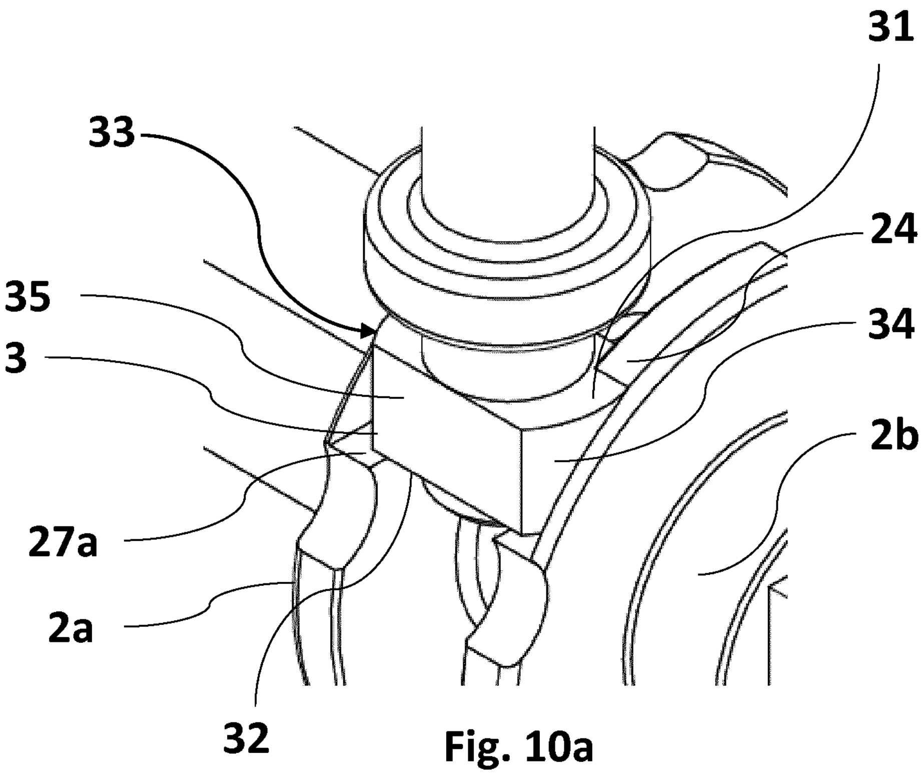
FIGS. 10*a*, 10*b* show perspective views of a blocking mechanism according to an embodiment of the present invention.
Figure 10B:
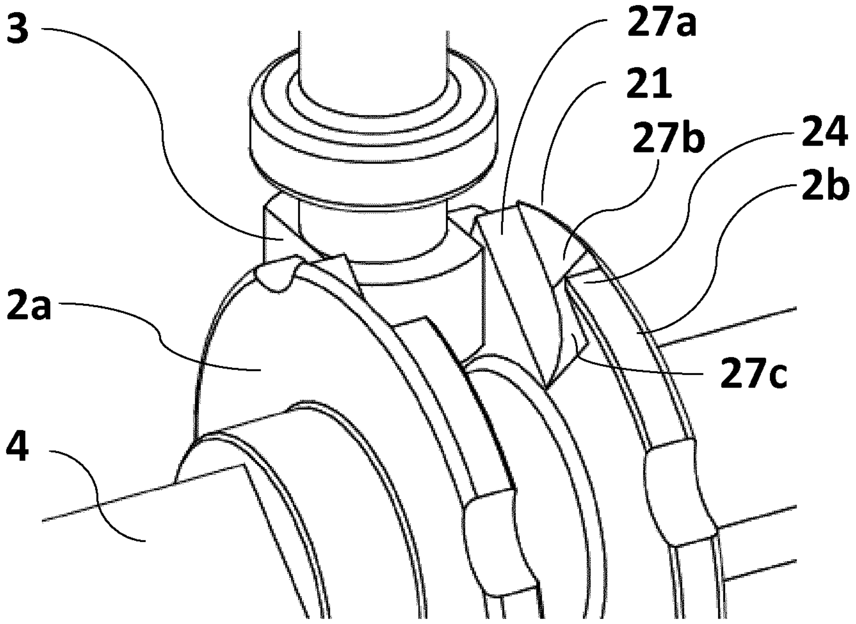
Figure 11A:
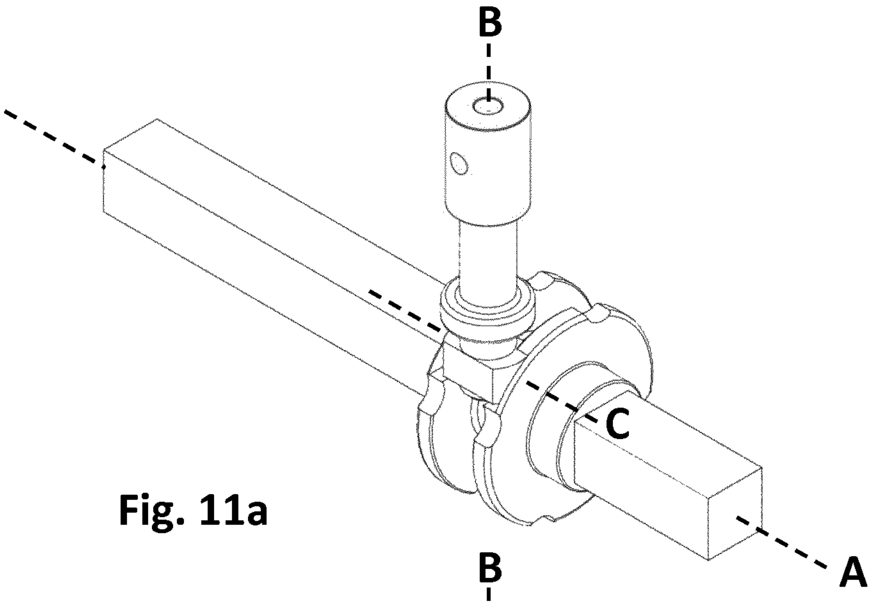
FIGS. 11*a-c* show perspective views of a blocking mechanism according to an embodiment of the present invention.
Figure 11B:
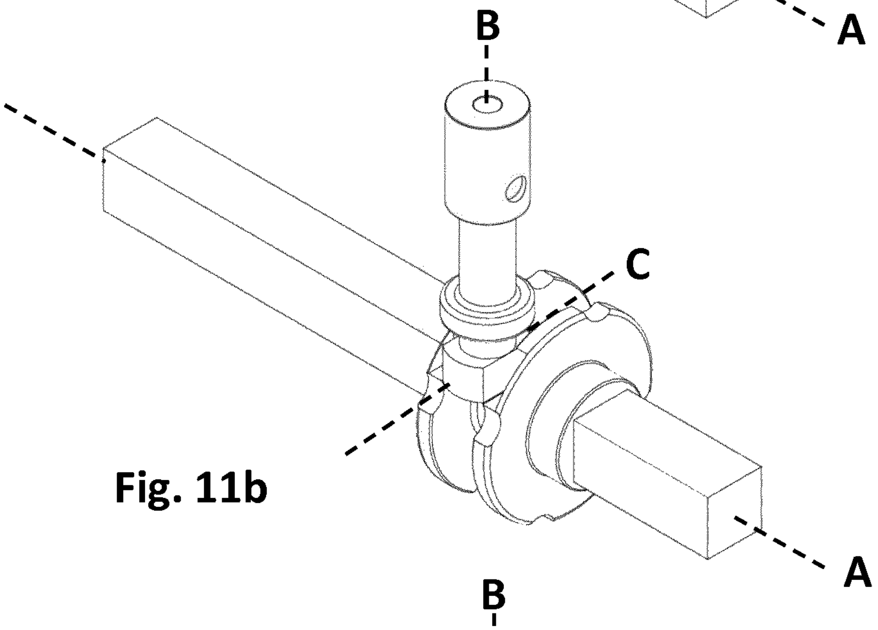
Figure 11C:
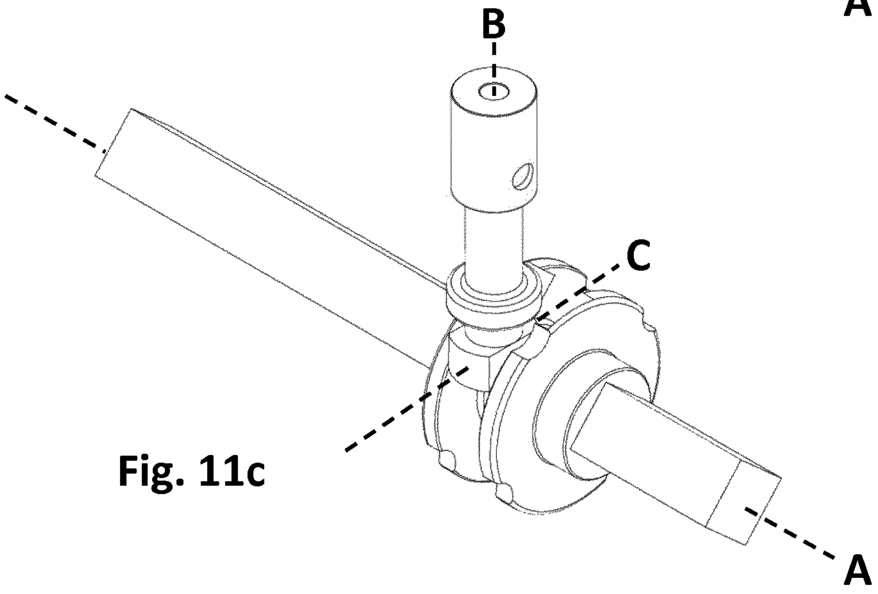

FIGS. 10*a*, 10*b* illustrates a zoomed in portion of the blocking member 3 of the blocking mechanism 1 depicted in FIGS. 9*a*, 9*b*, 9*c*. FIG. 10*a* shows the blocking member 3 when it is in a blocking position and FIG. 10*b* shows the blocking member 3 when the blocking member 3 is in an unblocked position and the catch member 2 has been rotated around the first axis A. As previously discussed, the blocking member 3 has two flat surfaces, the top surface 31 and the bottom surface 32, as well as two curved surfaces 33, 34. The blocking member 3 further has two flat side surfaces 35 (one not shown). The receiving surface 27*a* of each catch member 2*a*, 2*b* is configured to receive the bottom surface 32, while the receiving surfaces 27*b*, 27*c* of each catch member 2*a*, 2*b* is configured to receive each respective curved surface 33, 34. Each catch member 2*a*, 2*b* also comprises a flange 24 configured to abut the top surface 31 when the blocking member 3 is in a blocking position. The flange 24 prevents the catch member 2*a*, 2*b* to rotate in any direction when the blocking member 3 is in a blocking position. The rotation of the blocking member 3 as it rotates from a blocking position to an unblocked position is illustrated in FIGS. 11*a*, 11*b*, 11*c*.

Figure 12A:
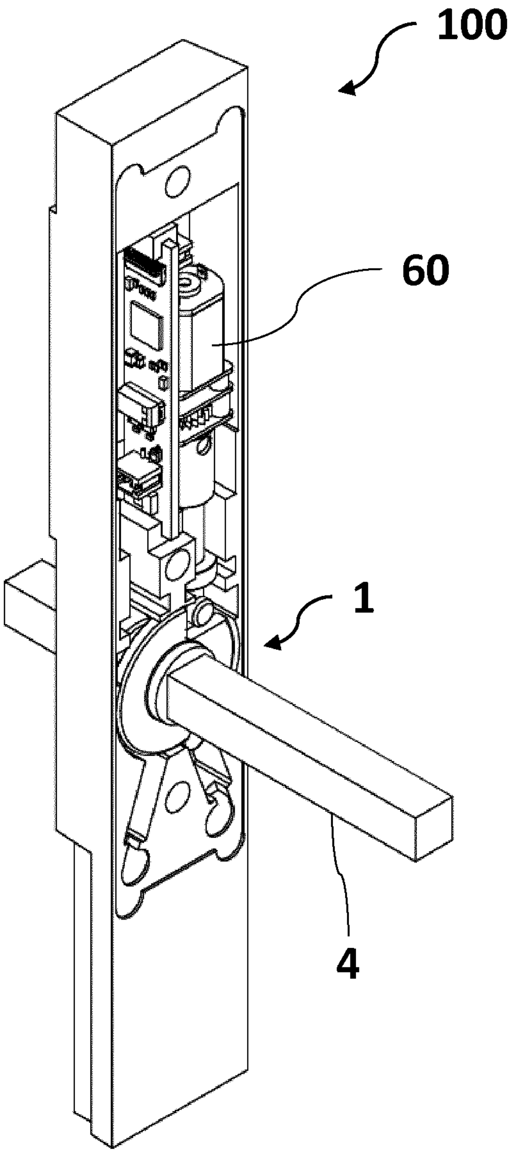
FIGS. 12*a-b* show views of a handle arrangement according to an embodiment of the present invention.
Figure 12B:
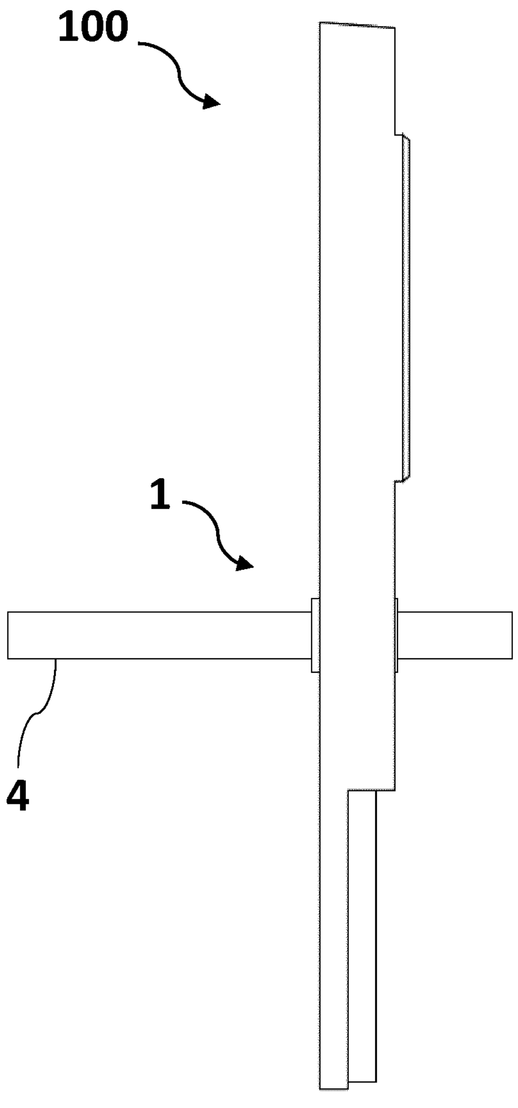
Figure 13A:
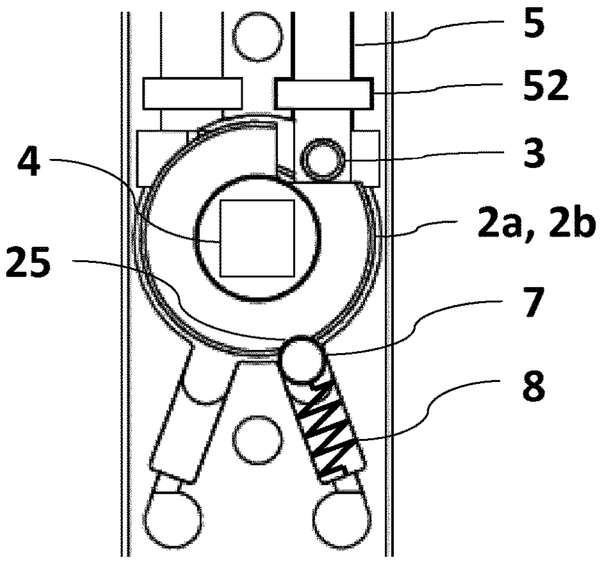
FIGS. 13*a-c* shows side views of a blocking mechanism according to an embodiment of the present invention.
Figure 13B:
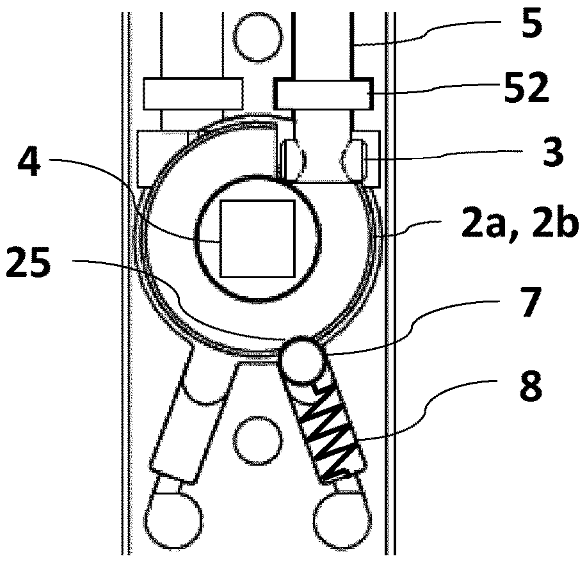
Figure 13C:
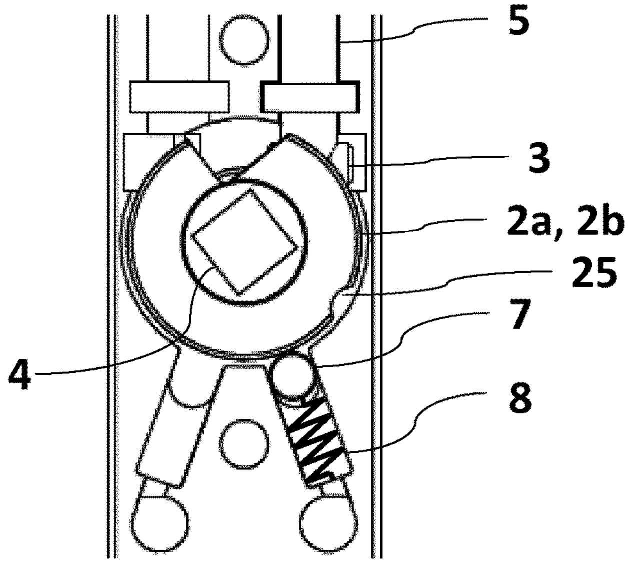

FIGS. 12*a*, 12*b* illustrates the blocking mechanism 1 depicted in FIGS. 1*a*, 1*b*, 1*c*, 2*a*, 2*b*, 2*c* when it has been arranged to a handle arrangement 100. FIG. 13*a*, 13*b*, 13*c* illustrate the same configuration of blocking mechanism 1 as the blocking member 3 is rotated from a blocking position to an unblocked position. When the blocking member 3 is in a blocking position as illustrated in FIG. 13*a*, the halting member 7 is pressed toward the catch members 2*a*, 2*b*, into the recess 25, by a spring 8. Said spring 8 and halting member 7 are configured to keep the catch member 2*a*, 2*b* in its current position while the blocking member 3 is rotated into an unblocked position, even if the catch member is subjected to a torque caused by gravity acting on the center of mass of the catch member which given the recess may be shifted away from its rotational center. When a sufficient torque is acting on the first shaft, enough to move the halting member out of the recess, the first shaft starts turning, and consequently the catch members as well, as illustrated in FIG. 13*c*.

Figure 14A:
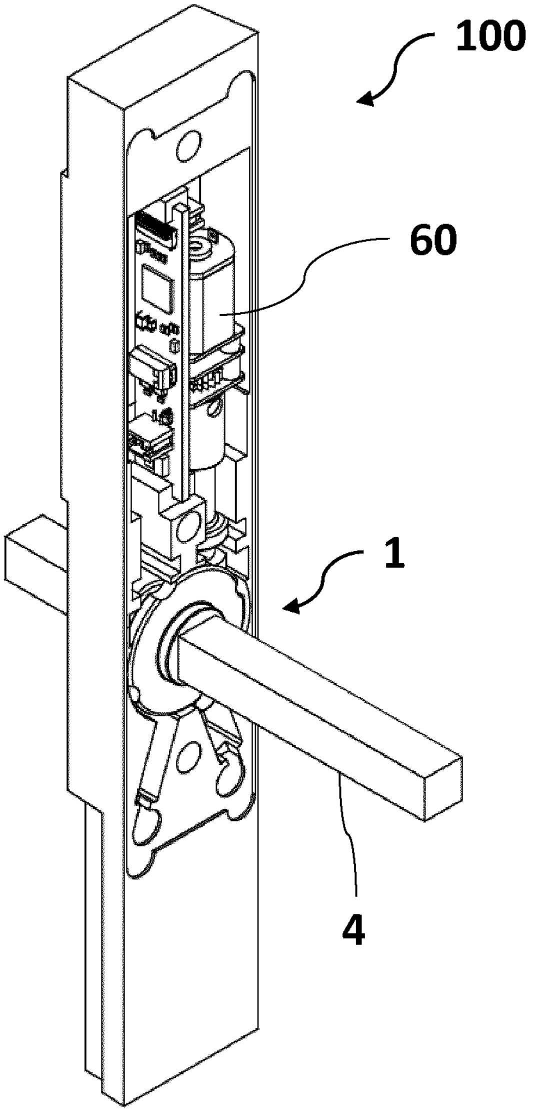
FIGS. 14*a-b* show views of a handle arrangement according to an embodiment of the present invention.
Figure 14B:
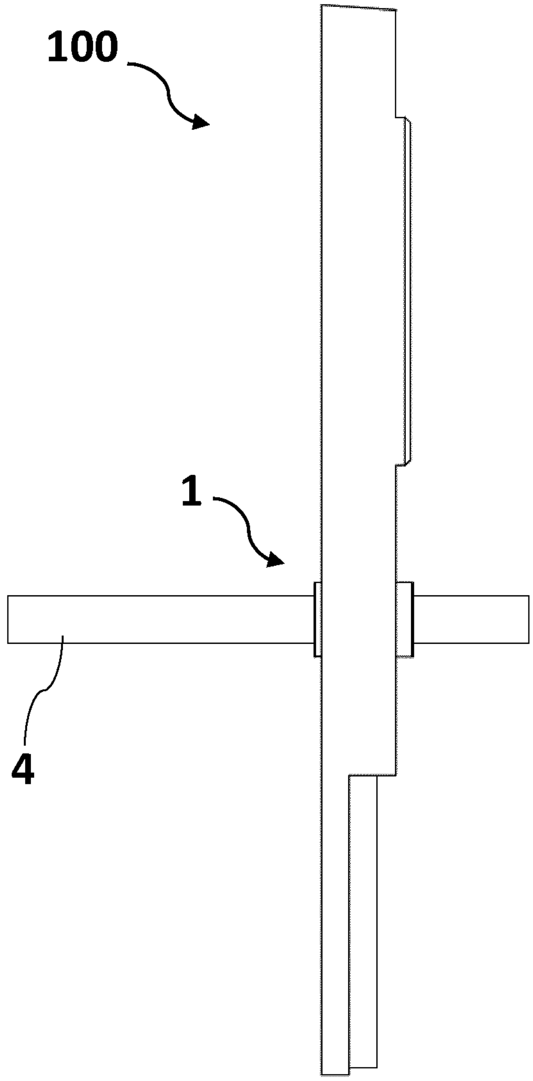
Figure 15A:
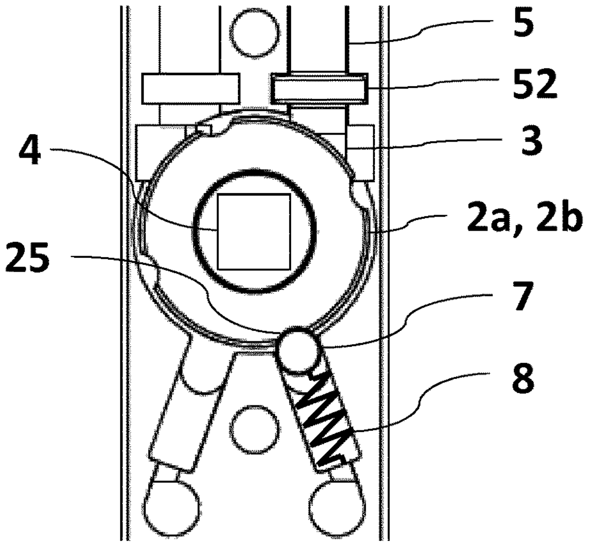
FIGS. 15*a-c* show side views of a blocking mechanism according to an embodiment of the present invention.
Figure 15B:
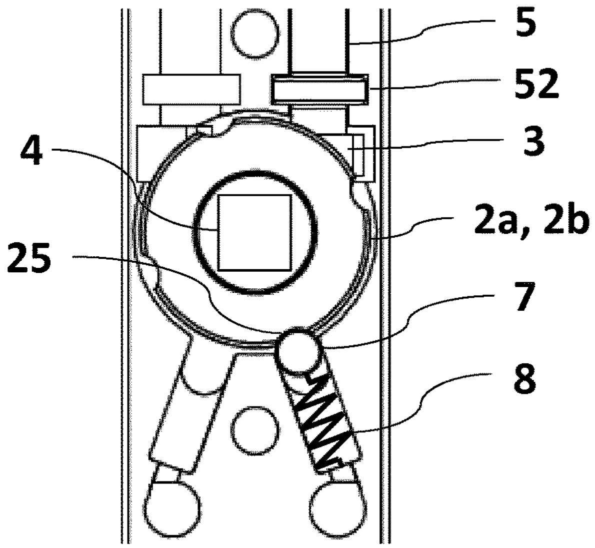
Figure 15C:
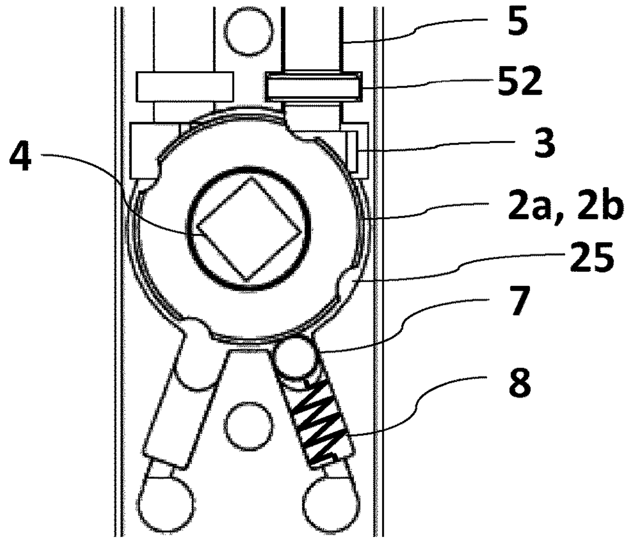

FIG. 14*a*, 14*b* illustrates the blocking mechanism 1 depicted in FIG. 9*a*, 9*b*, 9*c*, 10*a*, 10*b*, 11*a*, 11*b*, 11*c* when it has been arranged to a handle arrangement 100. FIG. 15*a*, 15*b*, 15*c* illustrate the same configuration of blocking mechanism as the blocking member 3 is rotated from a blocking position to an unblocked position.

The handle arrangements 100 illustrated in FIGS. 12 and 14 further comprises an electric motor 60 configured to rotate the second shaft 5. The configuration of the blocking mechanism 1 according to any of the embodiments provide a compact arrangement which may be suitable for low height handle arrangement with an electrically controlled blocking. Since the blocking member 3 is rotated around the second axis B, the second shaft 5 can be directly connected to the drive shaft of the electric motor 60. There is no need to transform the rotational movement of the electric motor 60 into e.g. a longitudinal movement. The handle housing of the handle arrangement 100 may further comprise the necessary electronic circuits to control the electric motor and the function of the blocking mechanism 1. Such electronic circuits may include means for wireless control of the blocking mechanism via the electric motor 60. The electronic circuits may further comprise means for detecting the position of the second shaft 5. Such detection may be used for the control of the electric motor 60, to determine when to start or stop the rotation of the second shaft 5. In one embodiment, the electronic circuits may comprise a positioning circuit which optically may determine a distance from a positioning diode to the second shaft, and the second shaft may comprise a recess providing a changed distance to the positioning diode. The position of the recess on the second shaft may be predetermined to correspond to a specific position of the blocking member. The second shaft 5 may comprise more than one recess of different depths to enable determination of a plurality of positions.

Figure 16A:
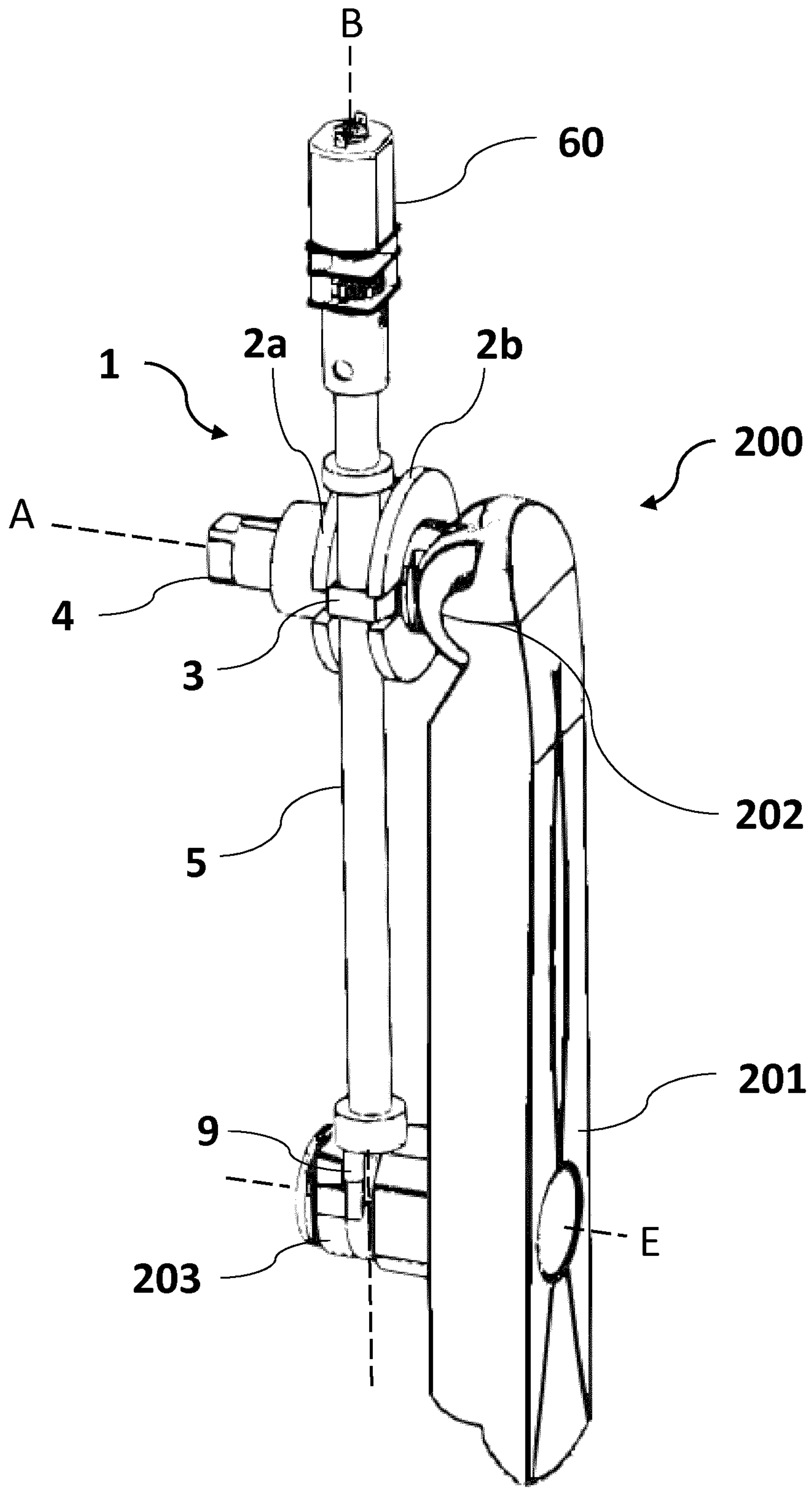
FIG. 16*a-b* show perspective views of a blocking mechanism arranged to a swing handle according to an embodiment of the present invention.
Figure 16B:
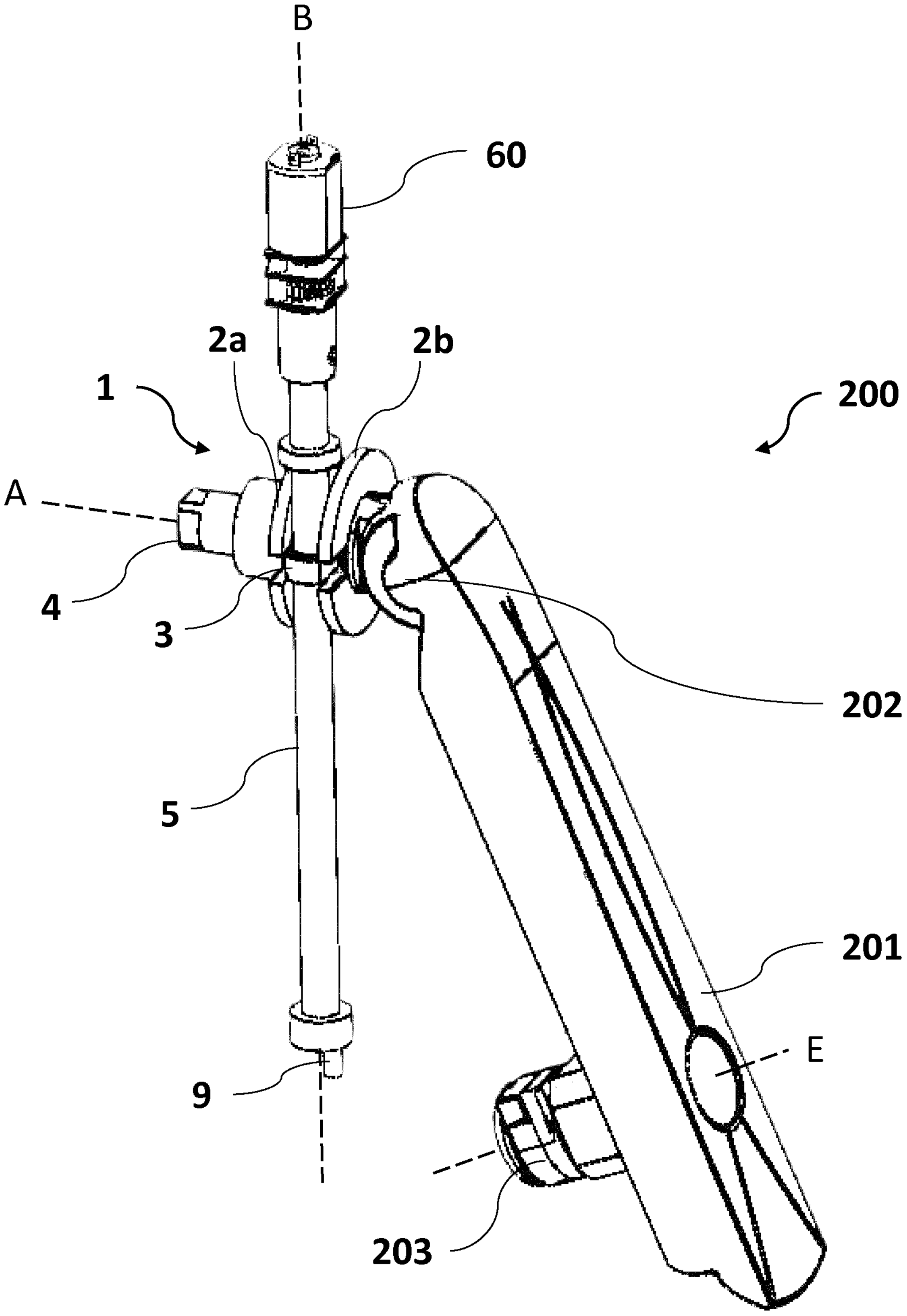

FIG. 16*a* and FIG. 16*b* illustrate the blocking mechanism 1 when arranged to a swing handle arrangement 200. The swing handle arrangement 200 comprises a swing handle 201 rotatable around a joint 202 and a locking member 203 rotatable at least partly around a fifth axis E. The swing handle arrangement 200 comprising the blocking mechanism 1 may be arranged to an openable element, such as a door or a window or the like. The illustrated swing handle arrangement 200 may further comprise a handle housing (not shown) in which the blocking mechanism 1 can be arranged. The swing handle 201 can be locked to the handle housing by means of the locking member 203. The locking member 203 may, in a locking position, engage with the handle housing to prevent the swing handle 201 from being moved relative to the handle housing. When arranged to said openable element, in its locking position, the locking member 203 prevents the swing handle 201 to rotate around the joint 202. The blocking mechanism 1 further comprises a second blocking member 9, also rotatable around the second axis B between a blocking position and an unblocked position, in which the swing handle 201 is released from the handle housing and rotatable around said joint 202.

The first blocking member 3 and the second blocking member 9 are arranged to the second shaft such that both the first 3 and the second blocking member 9 is in a blocking position at the same time, as showed in FIG. 16*a*. In this configuration, the swing handle 201 is blocked in place, locked to the handle housing, and cannot rotate around its joint 202 or around the first axis A. When the second shaft 5 is rotated, e.g. by an electric motor 60, both the first blocking member 3 and the second blocking member 9 is rotated toward an unblocked position. When reaching the unblocked position, the second blocking member 9 engages with the locking member 203 causing the locking member 203 to release the swing handle 201 from the handle housing. When the swing handle 201 is released from the handle housing, it may be lifted to a released position as illustrated in FIG. 16*b*. At rotation of the second shaft 5 to rotate the second blocking member 9 to the unblocked position, releasing the swing handle 201, the first blocking member 3 also rotates to its unblocked position. The swing handle 201 may then be rotated around the first axis A thus allowing the openable element to be opened.

The locking member 203 may be spring biased such that the swing handle 201 swings open to the position showed in FIG. 16*b* when the second blocking member 9 engages with the locking member 203 in the unblocked position. A user of the swing handle arrangement 200 is thereby visually notified that the swing handle arrangement 200 is opened and opening of the openable element is enabled. Alternatively, the user may be otherwise visually notified of the swing handle arrangement 200 being opened, e.g. by a light indication on the swing handle arrangement 200. Such visual notification may be activated when the second blocking member 9 has moved to the unblocked position, thereby enabling the swing handle 201 to be rotated around the joint 202.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A blocking mechanism for a handle arrangement, comprising,
- one or two catch members arranged on a first shaft extending along a first axis; and
- a blocking member arranged on a second shaft extending along a second axis, wherein the first axis and the second axis are displaced perpendicular to each other,
- wherein the blocking member is rotatable around the second axis between a blocking position, in which position the blocking member is engageable with the catch member to prevent the catch member from rotation around the first axis, and an unblocked position in which rotation of the catch member is enabled, and
- wherein the second shaft is placed relative to the first shaft such that a resulting acting force caused by an applied torque of rotation of the catch member is a force exerted by the catch member, coaxially with the second axis, onto the blocking member in the blocking position axially on the second shaft.

2. The blocking mechanism according to claim 1, wherein the blocking member extends along three perpendicular directions, being along a third axis, a fourth axis and the second axis, wherein said third axis being substantially parallel to the first axis when the blocking member is in a blocking position, wherein said blocking member is wider along said third axis than along said fourth axis.

3. The blocking mechanism according to claim 1, wherein the catch member has a recess or opening, said catch member comprising a receiving surface bounding each said recess or opening and configured for engaging with the blocking member when said blocking member is in the blocking position.

4. The blocking mechanism according to claim 1, wherein the catch member is substantially disc shaped.

5. The blocking mechanism according claim 1, wherein said blocking mechanism comprises two catch members arranged a distance apart on the first shaft.

6. The blocking mechanism according to claim 5, wherein the catch members are substantially identical in shape.

7. The blocking mechanism according to claim 3, wherein the catch member comprises a flange arranged a distance apart from the at least one receiving surface, such that the flange and the receiving surface abut the blocking member on opposite sides of the blocking member when the blocking member is in a blocking position.

8. The blocking mechanism according to claim 1, wherein the blocking member is substantially shaped as a modified cuboid, modified such that at least two surfaces of the cuboid are cylindrical surfaces, the modified cuboid comprising
- at least a first and a second flat surface arranged on opposite sides of the modified cuboid, said first and second flat surfaces extending along planes substantially perpendicular to the second axis;
- at least two cylindrical surfaces arranged on opposite sides of the modified cuboid, wherein the symmetry axis of the curvature of the first and the second cylindrical surfaces are parallel to the second axis.

9. The blocking mechanism according to claim 1, wherein the second shaft comprises a pressure absorbing flange or groove extending along a plane substantially perpendicular to the second axis.

10. The blocking mechanism according to claim 1, further comprising a halting member connected to a spring, said spring pushing the halting member toward the catch member, wherein said catch member comprises at least one recess configured for receiving said halting member such that the catch member is kept in a stationary position when the halting member is pushed into one of the at least one recesses configured for receiving said halting member.

11. The blocking mechanism according to claim 1, wherein the second shaft comprises a cavity, and the blocking member is a hardened pin arranged in said cavity.

12. A handle arrangement for arrangement to a door or a window, wherein said handle arrangement comprises a blocking mechanism according to claim 1.

13. A swing handle arrangement for arrangement to a door or a window, said swing handle arrangement comprising
- a blocking mechanism according to claim 1;
- a swing handle rotatable around a joint arranged to the first shaft of the blocking mechanism, wherein the blocking mechanism further comprises
- a second blocking member, also rotatable around the second axis between a blocking position, in which it engages with the swing handle, and an unblocked position, in which the swing handle is released from the second blocking member and rotatable around said joint.

* * * * *